US011763212B2

(12) United States Patent
Miller et al.

(10) Patent No.: US 11,763,212 B2
(45) Date of Patent: *Sep. 19, 2023

(54) ARTIFICIALLY INTELLIGENT COMPUTING ENGINE FOR TRAVEL ITINERARY RESOLUTIONS

(71) Applicant: Amgine Technologies (US), Inc., Dover, DE (US)

(72) Inventors: Jonathan David Miller, Austin, TX (US); Harold Roy Miller, Toronto (CA)

(73) Assignee: Amgine Technologies (US), Inc., Dover, DE (US)

( * ) Notice: Subject to any disclaimer, the term of this patent is extended or adjusted under 35 U.S.C. 154(b) by 788 days.

This patent is subject to a terminal disclaimer.

(21) Appl. No.: 16/396,487

(22) Filed: Apr. 26, 2019

(65) Prior Publication Data

US 2020/0027039 A1  Jan. 23, 2020

Related U.S. Application Data

(63) Continuation-in-part of application No. 13/420,179, filed on Mar. 14, 2012, now Pat. No. 10,275,810.

(Continued)

(51) Int. Cl.
*G06Q 10/02* (2012.01)
*G01C 21/34* (2006.01)
*G06Q 50/14* (2012.01)

(52) U.S. Cl.
CPC ......... *G06Q 10/025* (2013.01); *G01C 21/343* (2013.01); *G06Q 50/14* (2013.01)

(58) Field of Classification Search
CPC ...... G06Q 10/02–10/025; G06Q 30/06; G06Q 50/14; G06F 16/243; G06F 17/20; G06F 17/27; G06F 17/2785; G06F 17/28
See application file for complete search history.

(56) References Cited

U.S. PATENT DOCUMENTS 5,021,953 A  6/1991 Webber et al.
5,557,524 A  9/1996 Maki
(Continued)

FOREIGN PATENT DOCUMENTS

FR  3078806 A1  9/2019
WO  2009/033167 A1  3/2009
(Continued)

OTHER PUBLICATIONS

Niknafs, et al., A Case-Based Reasoning Approach in E-Tourism: Tour Itinerary Planning, Proceedings of the 14th International Workshop on Database and Expert Systems Applications (DEXA'03), 2003 (Year: 2003).*

(Continued)

*Primary Examiner* — Daniel Vetter
(74) *Attorney, Agent, or Firm* — Dickinson Wright PLLC

(57) ABSTRACT

Systems and methods for fulfilling travel requests are described herein. A method for fulfilling travel requests may commence with receiving a travel request from a user and determining itinerary components based on the travel request. The method may further include generating an itinerary network based on the itinerary components. The itinerary network may be generated by creating a plurality of nodes and creating a plurality of edges within the itinerary network. Each of the plurality of nodes may represent information associated with the travel request. The plurality of edges may represent an order of the plurality of nodes in time based on dependencies between the plurality of nodes. The method may further include generating a travel itinerary responsive to the travel request. The method may continue with presenting the generated travel itinerary to the user on a user interface of a computing device associated with the user.

19 Claims, 11 Drawing Sheets

Related U.S. Application Data

(60) Provisional application No. 62/747,088, filed on Oct. 17, 2018, provisional application No. 61/452,633, filed on Mar. 14, 2011.

(56) References Cited

U.S. PATENT DOCUMENTS

| | | |
|---|---|---|
| 5,797,127 A | 8/1998 | Walker et al. |
| 5,832,452 A | 11/1998 | Schneider et al. |
| 5,948,040 A | 9/1999 | DeLorme et al. |
| 6,059,724 A | 5/2000 | Campell et al. |
| 6,275,808 B1 | 8/2001 | DeMarcken |
| 6,307,572 B1 | 10/2001 | DeMarcken et al. |
| 6,477,520 B1 | 11/2002 | Malaviya et al. |
| 6,553,310 B1 | 4/2003 | Lopke |
| 6,795,710 B1 | 9/2004 | Creemer |
| 7,092,892 B1 | 8/2006 | Sobalvarro et al. |
| 7,181,438 B1 | 2/2007 | Szabo |
| 7,219,073 B1 | 5/2007 | Taylor et al. |
| 7,286,998 B2 | 10/2007 | Sauser et al. |
| 7,302,398 B2 | 11/2007 | Ban et al. |
| 7,680,777 B2 | 3/2010 | Poston et al. |
| 7,860,808 B2 | 12/2010 | Peters |
| 7,912,734 B2 | 3/2011 | Kil |
| 7,979,457 B1 | 7/2011 | Garman |
| 7,983,956 B1 | 7/2011 | Goel |
| 8,005,685 B1 | 8/2011 | Bird |
| 8,035,511 B2 | 10/2011 | Weaver et al. |
| 8,165,920 B2 | 4/2012 | Goel |
| 8,224,665 B2 | 7/2012 | Morris |
| 8,265,967 B2 | 9/2012 | de Marcken et al. |
| 8,332,247 B1 | 12/2012 | Bailey et al. |
| 8,510,133 B2 | 8/2013 | Peak et al. |
| 8,600,784 B1 | 12/2013 | Ivey et al. |
| 8,600,830 B2 | 12/2013 | Hoffberg |
| 8,631,007 B1 | 1/2014 | Blandford et al. |
| 8,762,160 B2 | 6/2014 | Lulla |
| 8,775,426 B2 | 7/2014 | Mukerjee et al. |
| 9,031,853 B2 | 5/2015 | Bartfeld |
| 9,043,151 B2 | 5/2015 | Cai et al. |
| 9,286,629 B2 | 3/2016 | Miller et al. |
| 9,449,151 B2 | 9/2016 | Etchegoyen |
| 9,659,099 B2 | 5/2017 | Miller et al. |
| 9,946,839 B1 | 4/2018 | Wilson et al. |
| 10,041,803 B2 | 8/2018 | Miller et al. |
| 10,078,855 B2 | 9/2018 | Miller et al. |
| 10,210,270 B2 | 2/2019 | Miller et al. |
| 10,275,810 B2 | 4/2019 | Miller et al. |
| 10,282,797 B2 | 5/2019 | Valverde, Jr. et al. |
| 10,311,068 B2 | 6/2019 | Tanne et al. |
| 10,740,412 B2 | 8/2020 | Bhat et al. |
| 2001/0044788 A1 | 11/2001 | Demir et al. |
| 2002/0069133 A1 | 6/2002 | Currie et al. |
| 2002/0082877 A1 | 6/2002 | Schiff et al. |
| 2002/0147619 A1 | 10/2002 | Floss et al. |
| 2002/0173978 A1 | 11/2002 | Boies et al. |
| 2002/0178034 A1 | 11/2002 | Gardner et al. |
| 2003/0018499 A1 | 1/2003 | Miller et al. |
| 2003/0023463 A1 | 1/2003 | Dombroski et al. |
| 2003/0050846 A1 | 3/2003 | Rodon |
| 2003/0055690 A1 | 3/2003 | Garback |
| 2003/0055772 A1 | 3/2003 | Goldstein |
| 2003/0135458 A1 | 7/2003 | Tadano et al. |
| 2003/0177044 A1 | 9/2003 | Sokel et al. |
| 2003/0217052 A1 | 11/2003 | Rubenczyk et al. |
| 2004/0002876 A1 | 1/2004 | Sommers et al. |
| 2004/0044516 A1 | 3/2004 | Kennewick et al. |
| 2004/0078213 A1 | 4/2004 | Brice et al. |
| 2004/0111255 A1 | 6/2004 | Huerta et al. |
| 2004/0220854 A1 | 11/2004 | Postrel |
| 2004/0249680 A1 | 12/2004 | Liew et al. |
| 2005/0033614 A1 | 2/2005 | Lettovsky et al. |
| 2005/0038644 A1 | 2/2005 | Napper et al. |
| 2005/0043940 A1 | 2/2005 | Elder |
| 2005/0108068 A1 | 5/2005 | Marcken et al. |
| 2005/0144162 A1 | 6/2005 | Liang |
| 2005/0220278 A1 | 10/2005 | Zirngibl et al. |
| 2005/0267651 A1 | 12/2005 | Arango et al. |
| 2005/0288973 A1 | 12/2005 | Taylor et al. |
| 2006/0106655 A1 | 5/2006 | Lettovsky et al. |
| 2006/0178931 A1 | 8/2006 | Horn |
| 2006/0241983 A1 | 10/2006 | Viale et al. |
| 2006/0247954 A1 | 11/2006 | Hunt |
| 2006/0265508 A1 | 11/2006 | Angel et al. |
| 2006/0271277 A1 | 11/2006 | Hu et al. |
| 2006/0285662 A1 | 12/2006 | Yin et al. |
| 2006/0293930 A1 | 12/2006 | Rodgers et al. |
| 2007/0073562 A1 | 3/2007 | Brice et al. |
| 2007/0073563 A1 | 3/2007 | Dourthe et al. |
| 2007/0100962 A1 | 5/2007 | Barth et al. |
| 2007/0106497 A1 | 5/2007 | Ramsey et al. |
| 2007/0106536 A1 | 5/2007 | Moore |
| 2007/0143154 A1 | 6/2007 | Ashby et al. |
| 2007/0156469 A1 | 7/2007 | Bird et al. |
| 2007/0168245 A1 | 7/2007 | de Marcken et al. |
| 2007/0168854 A1 | 7/2007 | de Marcken et al. |
| 2007/0174350 A1 | 7/2007 | Pell et al. |
| 2007/0185744 A1 | 8/2007 | Robertson |
| 2007/0192186 A1 | 8/2007 | Greene et al. |
| 2007/0198442 A1 | 8/2007 | Horn |
| 2007/0203735 A1 | 8/2007 | Ashton |
| 2007/0208503 A1 | 9/2007 | Harnsberger |
| 2007/0260495 A1 | 11/2007 | Mace et al. |
| 2007/0276595 A1 | 11/2007 | Lewinson et al. |
| 2007/0294149 A1 | 12/2007 | Lu et al. |
| 2008/0021748 A1 | 1/2008 | Bay et al. |
| 2008/0046274 A1 | 2/2008 | Geelen et al. |
| 2008/0052217 A1 | 2/2008 | Etkin |
| 2008/0059454 A1 | 3/2008 | Andrieu |
| 2008/0091525 A1 | 4/2008 | Kretz |
| 2008/0091557 A1 | 4/2008 | Celia et al. |
| 2008/0103949 A1 | 5/2008 | Lobana et al. |
| 2008/0109232 A1 | 5/2008 | Musgrove et al. |
| 2008/0114623 A1 | 5/2008 | Berthaud et al. |
| 2008/0120306 A1 | 5/2008 | Panabaker et al. |
| 2008/0201178 A1 | 8/2008 | Vizitei |
| 2008/0262995 A1 | 10/2008 | Zweig et al. |
| 2008/0319803 A1 | 12/2008 | Heyraud et al. |
| 2009/0005650 A1 | 1/2009 | Angell et al. |
| 2009/0006143 A1 | 1/2009 | Orttung et al. |
| 2009/0048876 A1 | 2/2009 | Bonissone et al. |
| 2009/0063359 A1 | 3/2009 | Connors |
| 2009/0070322 A1 | 3/2009 | Salvetti et al. |
| 2009/0112639 A1 | 4/2009 | Robinson |
| 2009/0157312 A1 | 6/2009 | Black et al. |
| 2009/0157664 A1 | 6/2009 | Wen |
| 2009/0177651 A1 | 7/2009 | Takamatsu et al. |
| 2009/0193352 A1 | 7/2009 | Bunn |
| 2009/0210262 A1 | 8/2009 | Rines et al. |
| 2009/0216633 A1 | 8/2009 | Whitsett et al. |
| 2009/0234681 A1 | 9/2009 | Champernowne |
| 2009/0240517 A1 | 9/2009 | Pelter |
| 2009/0313055 A1 | 12/2009 | Martin et al. |
| 2009/0319305 A1 | 12/2009 | Weissert et al. |
| 2009/0327148 A1 | 12/2009 | Kamar et al. |
| 2010/0010841 A1 | 1/2010 | Cooper et al. |
| 2010/0010978 A1 | 1/2010 | Carapella et al. |
| 2010/0030594 A1 | 2/2010 | Swart |
| 2010/0082241 A1 | 4/2010 | Trivedi |
| 2010/0153292 A1 | 6/2010 | Zheng et al. |
| 2010/0217680 A1 | 8/2010 | Fusz et al. |
| 2010/0217723 A1 | 8/2010 | Sauerwein, Jr. et al. |
| 2010/0317420 A1 | 12/2010 | Hoffberg |
| 2010/0318386 A1 | 12/2010 | Vaughan et al. |
| 2010/0324927 A1 | 12/2010 | Tinsley |
| 2011/0046989 A1 | 2/2011 | Crean et al. |
| 2011/0093361 A1 | 4/2011 | Morales |
| 2011/0125578 A1 | 5/2011 | Alspector et al. |
| 2011/0137766 A1 | 6/2011 | Rasmussen et al. |
| 2011/0153373 A1 | 6/2011 | Dantzig et al. |
| 2011/0167003 A1 | 7/2011 | Nice et al. |
| 2011/0231182 A1 | 9/2011 | Weider et al. |
| 2011/0246246 A1 | 10/2011 | Johnson |
| 2011/0295692 A1 | 12/2011 | Zivkovic et al. |

(56) References Cited

U.S. PATENT DOCUMENTS

| | | |
|---|---|---|
| 2011/0307241 A1 | 12/2011 | Waibel et al. |
| 2011/0307280 A1 | 12/2011 | Mandelbaum |
| 2011/0312870 A1 | 12/2011 | Beatty |
| 2012/0036158 A1 | 2/2012 | Cahill et al. |
| 2012/0054001 A1 | 3/2012 | Zivkovic et al. |
| 2012/0054054 A1 | 3/2012 | Kameyama |
| 2012/0059679 A1 | 3/2012 | de Marcken et al. |
| 2012/0089407 A1 | 4/2012 | Goldstein et al. |
| 2012/0209517 A1 | 8/2012 | Li et al. |
| 2012/0233207 A1 | 9/2012 | Mohajer |
| 2012/0239455 A1 | 9/2012 | Crean et al. |
| 2012/0239584 A1 | 9/2012 | Yariv et al. |
| 2012/0259667 A1 | 10/2012 | Pelissier et al. |
| 2012/0265598 A1 | 10/2012 | Krone |
| 2012/0265696 A1 | 10/2012 | Tuchman et al. |
| 2012/0330982 A1 | 12/2012 | Arnaud et al. |
| 2013/0166329 A1 | 1/2013 | Arnoux-Prost et al. |
| 2013/0041696 A1 | 2/2013 | Richard |
| 2013/0041902 A1 | 2/2013 | Swann et al. |
| 2013/0054375 A1 | 2/2013 | Sy et al. |
| 2013/0073323 A1 | 3/2013 | Zacharia et al. |
| 2013/0073325 A1 | 3/2013 | Ross |
| 2013/0090959 A1 | 4/2013 | Kvamme et al. |
| 2013/0096965 A1 | 4/2013 | Pappas et al. |
| 2013/0132129 A1 | 5/2013 | Fox et al. |
| 2013/0144889 A1 | 6/2013 | Gupta et al. |
| 2013/0151291 A1 | 6/2013 | Salway |
| 2013/0158821 A1 | 6/2013 | Ricci |
| 2013/0159023 A1 | 6/2013 | Srinivas et al. |
| 2013/0198036 A1 | 8/2013 | Pappas et al. |
| 2013/0261957 A1 | 10/2013 | Mahapatro et al. |
| 2013/0268532 A1 | 10/2013 | Doshi |
| 2013/0304349 A1 | 11/2013 | Davidson |
| 2013/0339105 A1 | 12/2013 | Russell et al. |
| 2014/0012659 A1 | 1/2014 | Yan |
| 2014/0019176 A1 | 1/2014 | Mandelbaum |
| 2014/0025540 A1 | 1/2014 | Hendrickson |
| 2014/0067483 A1 | 3/2014 | Jeong et al. |
| 2014/0074746 A1 | 3/2014 | Wang |
| 2014/0081793 A1 | 3/2014 | Hoffberg |
| 2014/0089020 A1 | 3/2014 | Murphy |
| 2014/0089036 A1 | 3/2014 | Chidlovskii |
| 2014/0089101 A1 | 3/2014 | Meller |
| 2014/0114705 A1 | 4/2014 | Bashvitz et al. |
| 2014/0156411 A1 | 6/2014 | Murgai |
| 2014/0229102 A1 | 8/2014 | Bapna et al. |
| 2014/0257949 A1 | 9/2014 | Gishen |
| 2014/0279196 A1 | 9/2014 | Wilson et al. |
| 2014/0304014 A1 | 10/2014 | Lee et al. |
| 2014/0330605 A1 | 11/2014 | Connolly et al. |
| 2014/0330606 A1 | 11/2014 | Paget et al. |
| 2014/0330621 A1 | 11/2014 | Nichols et al. |
| 2014/0337063 A1 | 11/2014 | Nelson et al. |
| 2015/0012309 A1 | 1/2015 | Buchheim et al. |
| 2015/0012467 A1 | 1/2015 | Greystoke et al. |
| 2015/0046201 A1 | 2/2015 | Miller et al. |
| 2015/0066594 A1 | 3/2015 | Li et al. |
| 2015/0066830 A1 | 3/2015 | Wilson et al. |
| 2015/0149432 A1 | 5/2015 | Hart et al. |
| 2015/0168169 A1 | 6/2015 | Caceres et al. |
| 2015/0193583 A1 | 7/2015 | McNair et al. |
| 2015/0227633 A1 | 8/2015 | Shapira |
| 2015/0235478 A1 | 8/2015 | Blandin et al. |
| 2015/0242927 A1 | 8/2015 | Will et al. |
| 2015/0278970 A1 | 10/2015 | Valverde, Jr. et al. |
| 2015/0339405 A1 | 11/2015 | Vora et al. |
| 2015/0356262 A1 | 12/2015 | Liebovitz et al. |
| 2016/0048928 A1 | 2/2016 | Davis et al. |
| 2016/0055162 A1 | 2/2016 | Woolf |
| 2016/0125559 A1 | 5/2016 | Shekou |
| 2016/0132791 A1* | 5/2016 | Jin .................. G06Q 50/14 705/5 |
| 2016/0162871 A1 | 6/2016 | Lee |
| 2016/0202073 A1 | 7/2016 | Claycomb et al. |
| 2016/0203422 A1 | 7/2016 | Demarchi et al. |
| 2016/0232626 A1 | 8/2016 | Geraci et al. |
| 2016/0258767 A1 | 9/2016 | Nevrekar et al. |
| 2016/0275194 A1 | 9/2016 | Borza et al. |
| 2016/0364815 A1 | 12/2016 | Miller et al. |
| 2016/0371799 A1 | 12/2016 | Miller et al. |
| 2016/0379142 A1 | 12/2016 | Valverde, Jr. et al. |
| 2017/0132740 A1 | 5/2017 | Waysbort et al. |
| 2017/0154353 A1 | 6/2017 | Ralston |
| 2017/0293722 A1 | 10/2017 | Valverde, Jr. et al. |
| 2018/0336642 A1 | 11/2018 | Miller |
| 2019/0012712 A1 | 1/2019 | Miller et al. |
| 2019/0122315 A1 | 4/2019 | Valverde, Jr. et al. |
| 2019/0179863 A1 | 6/2019 | Miller et al. |
| 2019/0243839 A1 | 8/2019 | Tanne et al. |
| 2019/0251643 A1 | 8/2019 | Valverde, Jr. et al. |
| 2019/0332921 A1 | 10/2019 | Rodriguez |

FOREIGN PATENT DOCUMENTS

| | | |
|---|---|---|
| WO | 2015021180 A1 | 2/2015 |
| WO | 2015153776 A1 | 10/2015 |
| WO | 2016201134 A1 | 12/2016 |
| WO | 2016205076 A1 | 12/2016 |
| WO | 2016205280 A1 | 12/2016 |
| WO | 2016209679 A1 | 12/2016 |
| WO | 2017180483 A1 | 10/2017 |

OTHER PUBLICATIONS

Rudnicky, et al., An Agenda-Based Dialog Management Architecture for Spoken Language Systems, IEEE Automatic Speech Recognition and Understanding Workshop, vol. 13, No. 4, 1999 (Year: 1999).*

International Search Report and Written Opinion dated Jun. 15, 2012 in International Patent Application No. PCT/US2012/029121 (8 pages).

International Search Report and Written Opinion dated Jun. 7, 2012 in International Patent Application No. PCT/US2012/029098 (6 pages).

International Search Report and Written Opinion dated Mar. 14, 2013 in International Patent Application No. PCT/US2012/029112 (6 pages).

International Search Report and Written Opinion dated Nov. 24, 2014 in International Patent Application No. PCT/US2014/049979 (8 pages).

Non-Final Office Action and Notice of References Cited dated Sep. 26, 2017 in U.S. Appl. No. 15/178,453 (12 pages).

Non-Final Office Action and Notice of References Cited dated Sep. 16, 2019 in U.S. Appl. No. 16/055,767 (7 pages).

Final Office Action and Notice of References Cited dated Apr. 18, 2017 in U.S. Appl. No. 14/453,420 (27 pages).

International Search Report and Written Opinion dated Jul. 2, 2015 in International Patent Application No. PCT/US2015/023901 (8 pages).

Examiner's Report dated May 18, 2016 in CA Patent Application No. 2,830,224 (6 pages).

Examiner's Report dated May 19, 2016 in CA Patent Application No. 2,830,229 (4 pages).

International Search Report and Written Opinion dated Jul. 11, 2016 in International Patent Application No. PCT/US2016/037555 (12 pages).

International Search Report and Written Opinion dated Sep. 1, 2016 in International Patent Application No. PCT/US2016/036760 (8 pages).

International Search Report and Written Opinion dated Sep. 9, 2016 in International Patent Application No. PCT/US2016/037503 (6 pages).

International Search Report and Written Opinion dated Sep. 27, 2016 in International Patent Application No. PCT/US2016/036749 (6 pages).

Examiner's Report dated Apr. 28, 2017 in CA Patent Application No. 2,830,229 (4 pages).

(56) References Cited

OTHER PUBLICATIONS

International Search Report and Written Opinion dated Jul. 7, 2017 in International Patent Application No. PCT/US2017/026708 (8 pages).
Mayerowitz, "Latest Airline Fee: $9 to Lock in Airfare", ABC News [online], Dec. 13, 2010 <http://web.archive.org/web/20110122133909/http://abcnews.go.com/Travel/airline-fees-forget-checked-bags-pay-lock-airfare/story?id=12385126> (p. 1) and Dec. 18, 2010 <http://web.archive.org/web/20101218074131/http://abcnews.go.com:80/Travel/airline-fees-forget-checked-bags-pay-lock-airfare/story?id=12385126&page=2 (p. 2), total 8 pages.
Examiner's Report dated Mar. 16, 2018 in CA Patent Application No. 2,830,229 (5 pages).
Non-Final Office Action dated Mar. 9, 2018 in U.S. Appl. No. 14/453,420 (38 pages).
Final Office Action and Notice of References Cited dated Aug. 27, 2018 in U.S. Appl. No. 14/453,420 (45 pages).
Tablan et al., "A Natural Language Query Interface to Structured Information", The Semantic Web: Research and Applications, ESWC 2008: Lecture Notes in Computer Science, vol. 5021, pp. 361-375.
Non-Final Office Action and Notice of References Cited dated Jan. 7, 2019 in U.S. Appl. No. 14/453,420 (47 pages).
Final Office Action and Notice of References Cited dated Mar. 29, 2019 in U.S. Appl. No. 14/453,420 (44 pages).
Examiner's Report dated Feb. 27, 2019 in CA Patent Application No. 2,944,652 (5 pages).
Examiner's Report dated Mar. 1, 2019 in CA Patent Application No. 2,830,229 (3 pages).
Examiner's Report dated Jun. 3, 2019 in CA Patent Application No. 3,021,147 (5 pages).
Examiner's Report dated Jul. 26, 2019 in CA Patent Application No. 2,989,325 (6 pages).
Non-Final Office Action and Notice of References Cited dated Jun. 5, 2018 in U.S. Appl. No. 15/595,795 (14 pages).
Non-Final Office Action and Notice of References Cited dated Mar. 11, 2015 in U.S. Appl. No. 13/420,433 (9 pages).
Non-Final Office Action and Notice of References Cited dated Feb. 26, 2016 in U.S. Appl. No. 13/420,433 (11 pages).
Non-Final Office Action and Notice of References Cited dated Dec. 16, 2013 in U.S. Appl. No. 13/419,989 (16 pages).
Non-Final Office Action and Notice of References Cited dated Dec. 5, 2014 in U.S. Appl. No. 13/419,989 (14 pages).
Notices of Allowance and References Cited dated Dec. 18, 2015 in U.S. Appl. No. 13/419,989 (15 pages).
Non-Final Office Action and Notice of References Cited dated Oct. 21, 2014 in U.S. Appl. No. 13/420,179 (10 pages).
Non-Final Office Action and Notice of References Cited dated Aug. 12, 2015 in U.S. Appl. No. 14/750,841 (15 pages).
Non-Final Office Action and Notice of References Cited dated Aug. 14, 2015 in U.S. Appl. No. 14/676,302 (19 pages).
Final Office Action and Notice of References Cited dated Apr. 6, 2016 in U.S. Appl. No. 14/676,302 (26 pages).
Final Office Action and Notice of References Cited dated Jul. 11, 2016 in U.S. Appl. No. 13/420,433 (12 pages).
Non-Final Office Action and Notice of References Cited dated Sep. 20, 2016 in U.S. Appl. No. 14/453,420 (29 pages).
Non-Final Office Action and Notice of References Cited dated Nov. 30, 2016 in U.S. Appl. No. 14/676,302 (20 pages).
Non-Final Office Action and Notice of References Cited dated Dec. 29, 2016 in U.S. Appl. No. 14/750,841 (16 pages).
Non-Final Office Action and Notice of References Cited dated Jul. 13, 2016 in U.S. Appl. No. 15/069,791 (12 pages).
Non-Final Office Action and Notice of References Cited dated Jun. 22, 2016 in U.S. Appl. No. 13/420,179 (13 pages).
Notices of Allowance and References Cited dated Dec. 27, 2018 in U.S. Appl. No. 13/420,179 (13 pages).
Non-Final Office Action and Notice of References Cited dated Jul. 12, 2018 in U.S. Appl. No. 15/183,620 (14 pages).
Non-Final Office Action and Notice of References Cited dated Feb. 7, 2019 in U.S. Appl. No. 14/750,841 (18 pages).
Non-Final Office Action and Notice of References Cited dated Mar. 13, 2020 in U.S. Appl. No. 14/750,841 (25 pages).
Non-Final Office Action and Notice of References Cited dated Aug. 24, 2018 in U.S. Appl. No. 15/178,064 (30 pages).
Final Office Action and Notice of References Cited dated Feb. 19, 2019 in U.S. Appl. No. 15/178,064 (33 pages).
Non-Final Office Action and Notice of References Cited dated Oct. 7, 2019 in U.S. Appl. No. 15/178,064 (44 pages).
Notices of Allowance and Cited References dated Oct. 29, 2021 in U.S. Appl. No. 16/854,753 (10 pages).
Notice of Allowance and References Cited in U.S. Appl. No. 14/750,841, dated Mar. 23, 2021 (12 pages).
PR Newswire, "GetGoing Launches Multi-Supplier Hotel Merchandising Platform: BCD Travel Signs Multi-Year Agreement to Streamline Hotel Booking for Travel Management Companies", New York, PR Newswire Association LLC, Sep. 23, 2014 (2-3 pages).
Non-Final Office Action and Notice of References Cited dated Nov. 29, 2018 in U.S. Appl. No. 15/183,620 (17 pages).
Non-Final Office Action and Notice of References Cited dated May 22, 2019 in U.S. Appl. No. 15/183,620 (16 pages).
Non-Final Office Action and Notice of References Cited dated Apr. 17, 2019 in U.S. Appl. No. 15/482,619 (42 pages).
Non-Final Office Action and Notice of References Cited dated Apr. 14, 2020 in U.S. Appl. No. 15/979,275 (14 pages).
Non-Final Office Action and Notice of References Cited dated May 28, 2020 in U.S. Appl. No. 16/142,834 (33 pages).
United Hub, "FareLock: An Opportunity to Lock in Your Ticket Price for up to Seven Days", Jul. 28, 2012 <https://web.archive.org/web/20120728071904/https7/www.united.com/CMS/en-US/products/travelproducts/Pages/FareLock.aspx>, Aug. 17, 2012 <https://hub.united.com/en-us/news/products-services/pages/farelock-lets-you-lock-in-your-ticket-price.aspx> (3 pages).
Mackenzie, "Two Services Help You Lock in a Good Deal on Airfare", Hack My Trip, Apr. 2014 <http://hackmytrip.com/2014/04/two-services-help-lock-good-deal-airfare> (9 pages).
Boardman, "Options Away", Vimeo, May 24, 2013 <http://vimeo.com/66936261> (2 pages).
Goddeau, et al., "Galaxy: A Human-Language Interface to On-Line Travel Information", 3rd International Conference an Spoken Language Processing (ICSLP94), Yokohama, Japan, Sep. 18-22, 1994, pp. 707-710.
Subramoni, "Topology-Aware MPI Communication and Scheduling for High Performance Computing Systems", Ohio State University, 2013, 151 pages.
United Airlines, "FareLock", webpage, Jul. 28, 2012 <https://www.united.com/CMS/en-US/products/travel/products/Pages/FareLock.aspx> (4 pages).
Federal Trade Commission, "Using Layaway Plans", webpage, Dec. 19, 2012 <http://web.archive.org/web/20121219044435/https://www.consumer.ftc.gov/articles/0128-using-layaway-plans> (2 pages).
Notices of Allowance and References Cited dated Jul. 9, 2021 in U.S. Appl. No. 16/275,133 (12 pages).
Notices of Allowance and Cited References dated Feb. 23, 2023 in U.S. Appl. No. 17/502,625 (8 pages).
Non-Final Office Action and Notice of References Cited dated Apr. 24, 2023 in U.S. Appl. No. 17/106,022 (17 pages).
Non-final Office Action and Notice of References Cited dated Jul. 20, 2023 in U.S. Appl. No. 17/118,259 (22 pages).
Canadian Office Action dated Jun. 8, 2023 in Canadian Patent Application No. 2,988,977 (4 pages).

\* cited by examiner

ARTIFICIALLY INTELLIGENT COMPUTING ENGINE FOR TRAVEL ITINERARY RESOLUTIONS

CROSS REFERENCE TO RELATED APPLICATIONS

This application is a Continuation-in-part and claims the priority benefit of U.S. non-provisional patent application Ser. No. 13/420,179, filed Mar. 14, 2012, which in turn claims the priority benefit of U.S. provisional patent application Ser. No. 61/452,633, filed Mar. 14, 2011. The present application also claims the priority benefit of U.S. provisional patent application Ser. No. 62/747,088 filed on Oct. 17, 2018.

U.S. non-provisional patent application Ser. No. 13/420,179, filed Mar. 14, 2012 is related to the Applicants' U.S. non-provisional patent application Ser. No. 13/419,989, filed Mar. 14, 2012 and issued Mar. 15, 2016, as U.S. Pat. No. 9,286,629, and to the Applicants' U.S. non-provisional patent application Ser. No. 13/420,433, filed Mar. 14, 2012 and issued Sep. 18, 2018, as U.S. Pat. No. 10,078,855. All of the above referenced applications are hereby incorporated by reference herein in their entirety.

FIELD OF THE PRESENT TECHNOLOGY

The present technology relates generally to the processing and fulfilling of natural language travel requests, and more specifically, but not by way of limitation, to an exchange that allows suppliers to provide inventory records and customers to input travel itinerary requests in a natural language format, and fulfills the travel itinerary requests by applying pattern recognition artificial intelligence and/or semantic parsing to inventory records and travel itinerary requests to obtain matches therebetween.

BACKGROUND

The ability to sell more inventory/content, sell current inventory more efficiently, and to differentiate product is extremely important and urgent to suppliers, especially in the travel and hospitality industries. Additionally, consumers want and need more choice and inventory/content. The current legacy supply chain for fulfilling travel related needs of consumers is complicated and remains under the control of various companies, most of which directly or indirectly compete with one another. Even if those within the supply chain are not hindered from cooperating by competition, the division of services/responsibilities within a single supplier may further hinder these legacy supply chains. For example, with respect to an airline, current inventory may be maintained by one entity or department while flights are managed by another department and/or business. Moreover, airline rules and pricing may be managed by yet another department and/or business. Business processes that interact with these legacy systems must be structured to correspond to these entities and their rules. For each entity, a completely different set of requirements may be imposed upon business processes that depend upon these entities. In sum, the structures of these legacy supply chain systems make it extremely difficult, if not impractical, to properly aggregate offerings and/or add new inventory/content that would be recognized and accepted by the legacy systems.

Furthermore, conventional artificial intelligence engines available in the market use of a posteriori artificial intelligence that is entirely dependent on data and experience and, hence, requires large amounts of resources to collect data and analyze experience.

SUMMARY OF THE PRESENT TECHNOLOGY

This disclosure is directed to systems and methods or fulfilling travel requests. According to some embodiments, a method for fulfilling travel requests may commence with receiving a travel request from a user and determining itinerary components based on the travel request. The method may further include generating an itinerary network based on the itinerary components. The itinerary network may be generated by creating a plurality of nodes and creating a plurality of edges within the itinerary network. Each of the plurality of nodes may represent information associated with the travel request. Each of the plurality of edges may connect two of the plurality of nodes. The plurality of edges may represent an order of the plurality of nodes in time based on dependencies between the plurality of nodes. The method may further include generating a travel itinerary responsive to the travel request. The travel itinerary may be consistent with the itinerary network. The method may continue with presenting the generated travel itinerary to the user on a user interface of a computing device associated with the user.

According to other embodiments, the present technology may be directed to a system for fulfilling travel requests. The system may include a memory for storing executable instructions, a processor for executing the instructions, and a parser stored in the memory and executable by the processor. The parser may be configured to receive a travel request from a user and determine itinerary components based on the travel request. The parser may be further configured to generate an itinerary network by creating a plurality of nodes within the itinerary network and creating a plurality of edges within the itinerary network. Each of the plurality of nodes may represent information associated with the travel request. Each of the plurality of edges may connect two of the plurality of nodes. The plurality of edges may represent an order of the plurality of nodes in time based on dependencies between the plurality of nodes. The parser may be further configured to generate a travel itinerary responsive to the travel request. The travel itinerary may be consistent with the itinerary network. The parser may be further configured to present the generated travel itinerary to the user on a user interface of a computing device associated with the user.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION OF EXEMPLARY EMBODIMENTS

Figure 1:
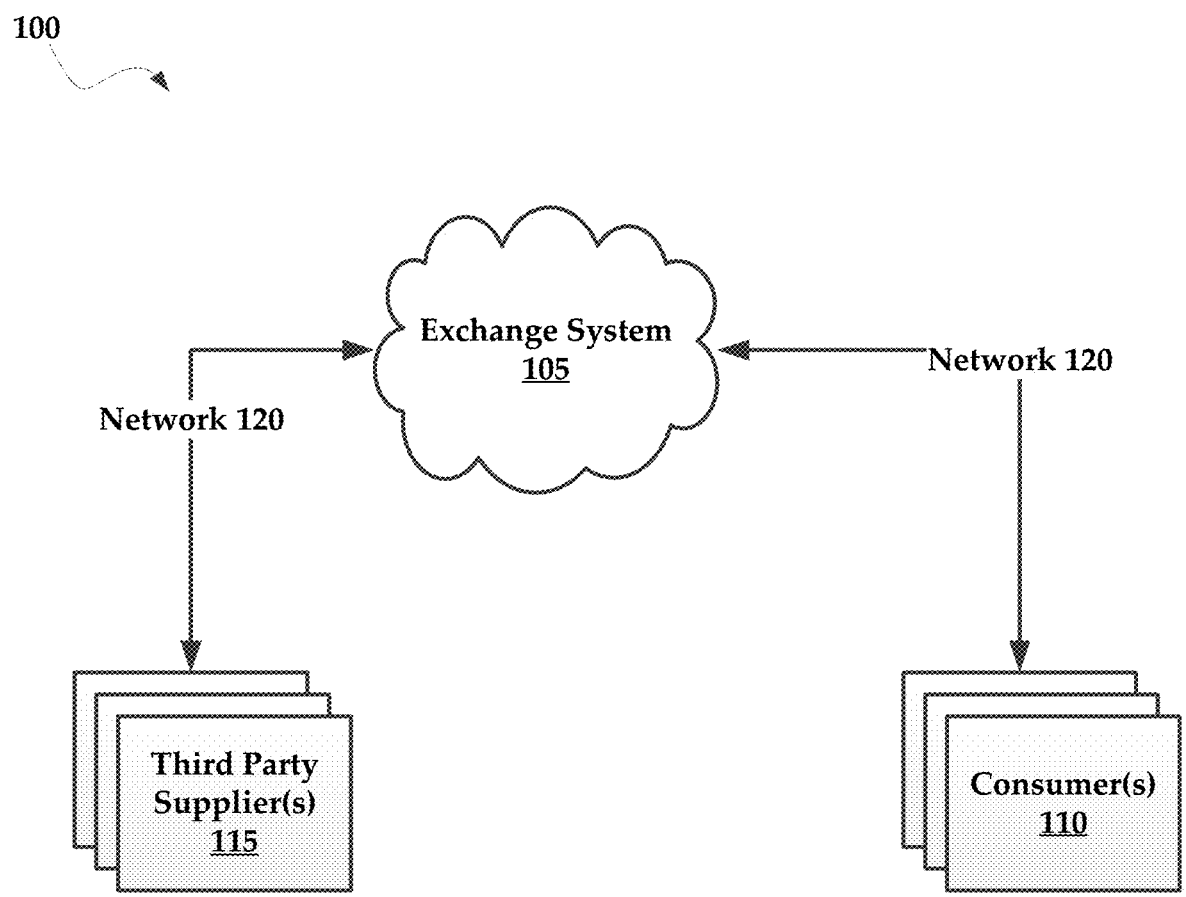
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology comprises systems, methods, and media for processing natural language travel requests. More specifically, but not by limitation, the present technology may fulfill travel requests in the form of natural language expressions of a travel itinerary. An artificial intelligence engine used in methods and systems of the present disclosure may act as a priori artificial intelligence engine (i.e., may assume an a priori knowledge of certain structures). The present technology provides an efficient and simplified supply chain for the addition, organization, and consumption of inventory, together with a simplified distribution model. Additionally, the systems provided herein may also interact seamlessly with, and coexist with, legacy systems.

Advantageously, the present technology provides increased efficiency and capabilities, allowing access to greater amounts of content that may be utilized to fulfill natural language travel requests. Unlike most systems or search engines, where a URL is provided as a solution or a few thousand options for a single request or a component of a request, the preset technology provides coherent solution(s) for natural language travel requests.

Additionally, the present technology may be implemented within the context of an exchange system that allows suppliers to provide inventory records and customers to input travel itinerary requests in a natural language format and fulfills the travel itinerary requests by applying pattern recognition artificial intelligence and/or semantic parsing to inventory records and travel itinerary requests to obtain matches therebetween.

Referring to the collective drawings (e.g., FIGS. 1-11), the present technology may facilitate an exchange that fulfills natural language travel requests. The present technology may be implemented within the context of an exemplary architecture 100, hereinafter "architecture 100" as shown in FIG. 1. The architecture 100 may be described as generally including an exchange 105 (also referred to herein as exchange system 105). Consumers 110 and third party suppliers 115 may communicate with either the exchange 105, via a network 120. It is noteworthy to mention that the network 120 may include any one (or combination) of private or public communications networks such as the Internet. The consumers 110 may interact with the exchange 105 via end user client devices that access a web based interface or an application resident on the end user client device.

In some embodiments, the third party suppliers 115 may communicatively couple with the exchange 105 over the network 120 via an application programming interface (API). It is noteworthy that other methods/systems that allow the third party suppliers 115 and the exchange 105 to communicatively couple with one another, that would be known to one or ordinary skill in the art, are likewise contemplated for use in accordance with the present disclosure.

For the purposes of brevity and clarity, certain functional and/or structural aspects of the exchange 105 will be described in greater detail herein. More specifically, but not by way of limitation, the present disclosure will address the processing and fulfillment of natural language travel requests. Additional details regarding the exchange 105 may be found in co-pending U.S. non-provisional patent application Ser. No. 13/420,433, filed Mar. 14, 2012 and issued Sep. 18, 2018, as U.S. Pat. No. 10,078,855, which is hereby incorporated by reference herein in its entirety.

According to some embodiments, the exchange 105 may include a cloud based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo! ™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

The exchange 105 may be generally described as a particular purpose computing environment that includes executable instructions that are configured to receive and fulfill natural language requests, such as travel itinerary requests.

Figure 2:
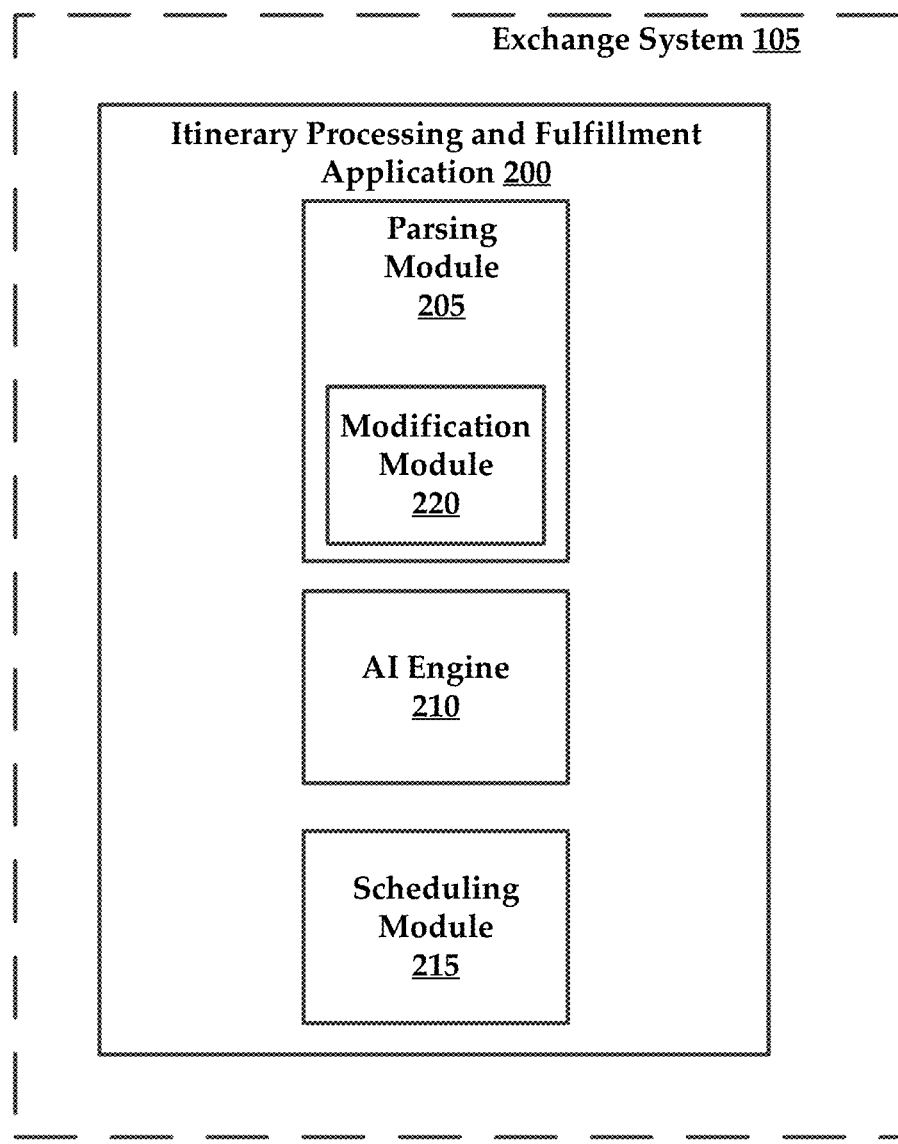
FIG. 2 illustrates an exemplary itinerary processing system, constructed in accordance with the present technology.

In some embodiments, the exchange 105 may include executable instructions in the form of an itinerary processing and fulfillment application, hereinafter referred to as "application 200," "a system for fulfilling travel requests," or "a system." The application provides various functionalities that will be described in greater detail herein. FIG. 2 illustrates and exemplary schematic diagram of the application 200.

The application 200 is shown as generally comprising components such as a semantic parsing module, hereinafter referred to "a parser" or "parsing module 205," a pattern recognition artificial intelligence engine, hereinafter "AI engine 210," a scheduling module 215 (also referred to herein as scheduling module 215), and a modification module 220. It is noteworthy that the application 200 may include additional modules, engines, or components, and still fall within the scope of the present technology. As used herein, the terms "module" and "engine" may also refer to any of an application-specific integrated circuit (ASIC), an electronic circuit, a processor (shared, dedicated, or group) that executes one or more software or firmware programs, a combinational logic circuit, and/or other suitable components that provide the described functionality. In other embodiments, individual components of the application 200 may include separately configured web servers.

Figure 3:
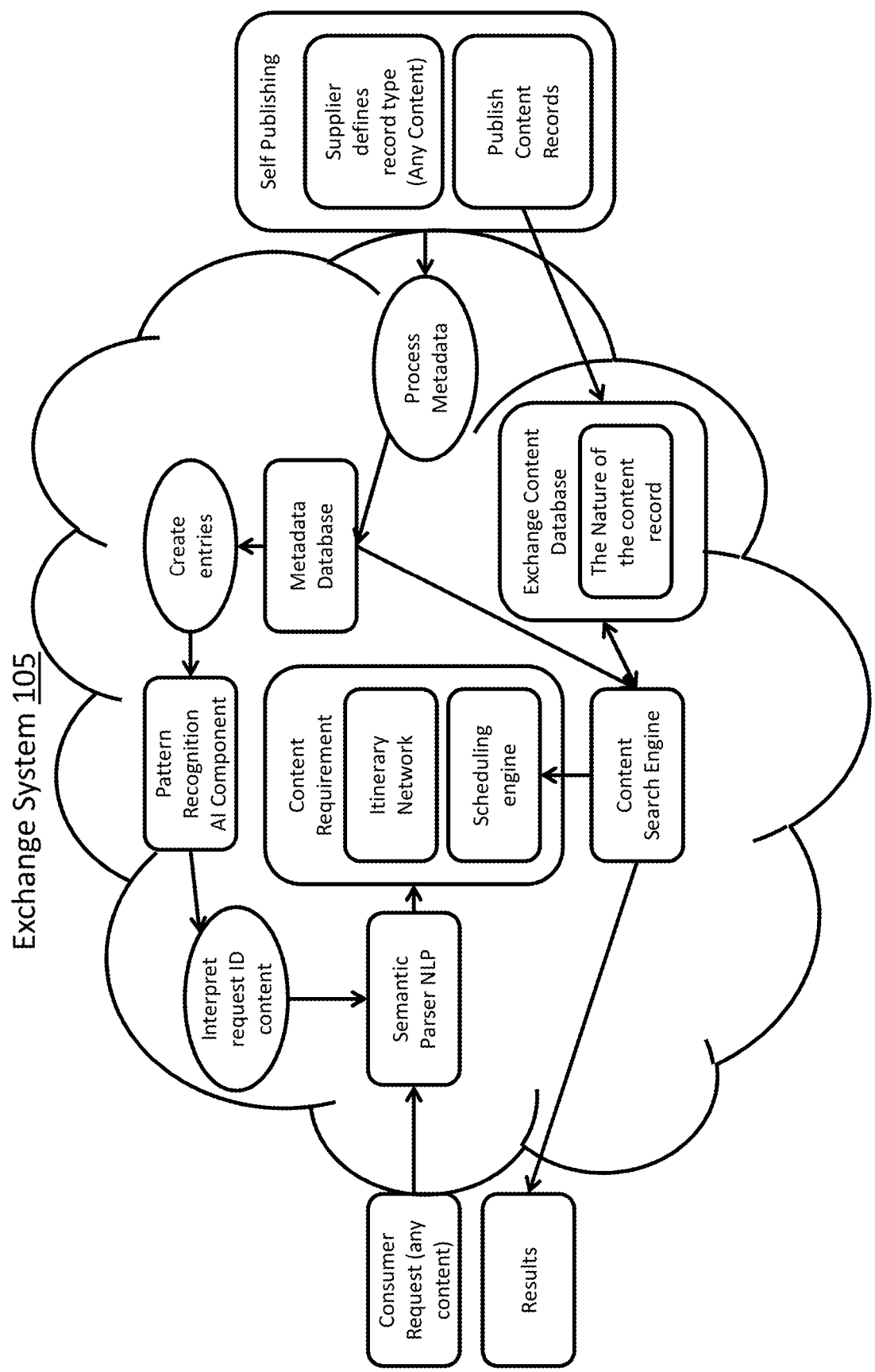
FIG. 3 illustrates flow diagram of events through an exchange system.

FIG. 3 includes an exemplary flow diagram that illustrates the flow of data from a publishing environment into an exchange, along with the receipt of natural language travel requests and their fulfillment. While functional details regarding how the exchange 105 processes and fulfills natural language travel requests will be described with reference to additional figures described below (e.g., FIGS. 4-6), the overall operational flow of the exchange system 105 is shown in FIG. 3.

Figure 4:
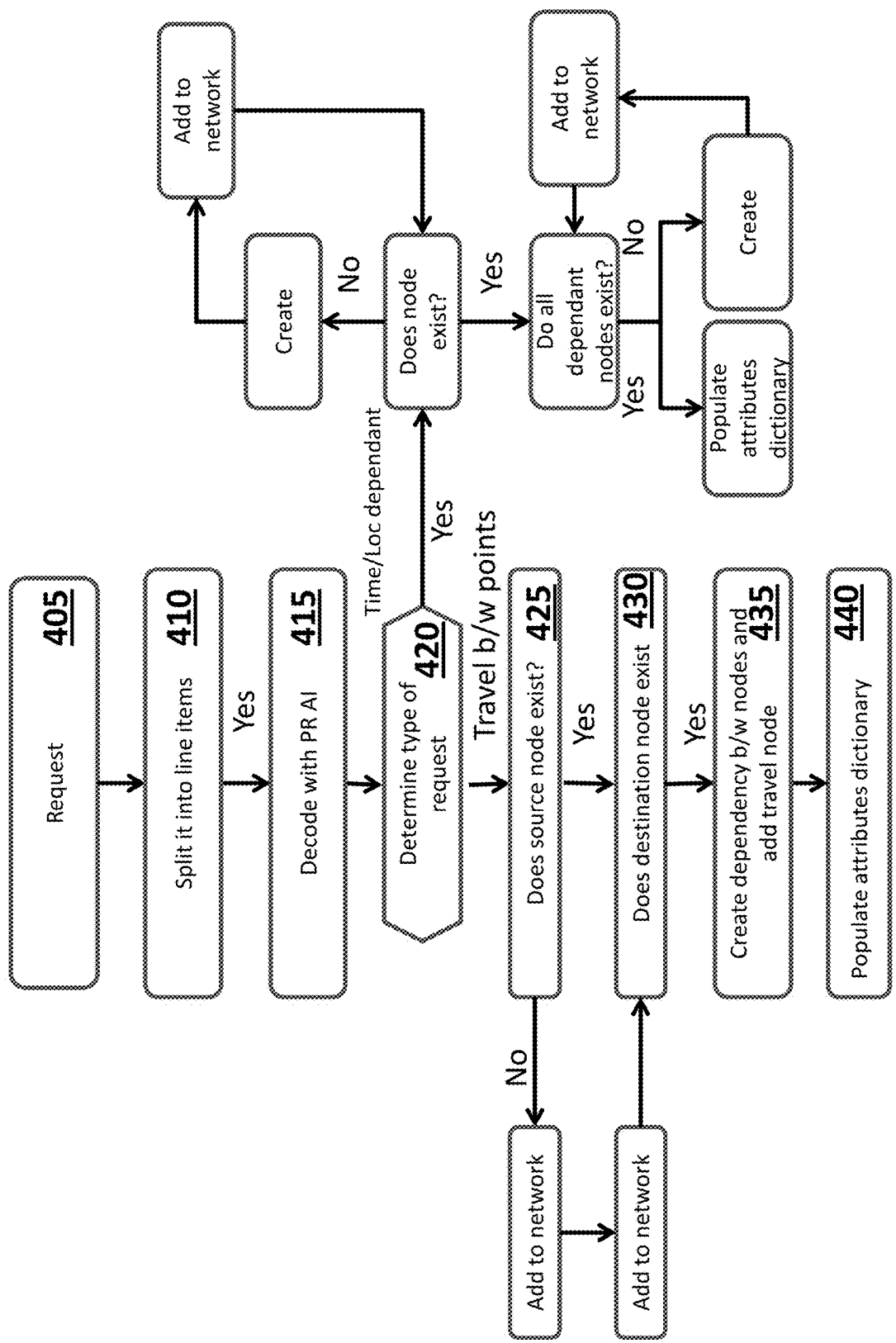
FIG. 4 illustrates a flow diagram on an exemplary method for processing natural language travel requests.

Referring now to FIGS. 2 and 4 collectively, the scheduler module 215 may utilize the parsing module 205 to interpret the natural language queries. FIG. 4 illustrates a flowchart of an exemplary method for processing natural language travel requests.

According to some embodiments, the parsing module 205 may assume an a priori knowledge of certain structures and intent over a class of information (for example, the hospitality and travel space).

Initially, it is noteworthy to mention that the natural language travel requests received by the parsing module 205 may comprise a textual request, a spoken (e.g., audio format) request, a location based request, an input based request (e.g., a click of an object on a map), a global positioning signal, and/or any combinations thereof. Moreover, in some instances, the request may comprise a non-natural language request, such as a keyword request, a Boolean phrase, and so forth.

In this sense, the information requested by the end user in natural language may not be parsed by the parsing module 205 for grammar in the sense that a normal parser would operate. Rather, the parsing module 205 may infer a predetermined set of information through a pattern recognition artificial intelligence module, such as the AI engine 210.

More specifically, the parsing module 205 may first (Step 405) delimit the natural language query. For example, the parsing module 205 may determine inventory components in the query.

The parsing module 205 may parse through each delimited string (Step 410) and transmit the delimited strings to the AI engine 210.

The AI engine 210 may act as an a priori AI engine (i.e., may assume an a priori knowledge of certain structures). While the a priori AI engine is discussed herein in terms of its application to travel, a person of ordinary skill in the art would understand that the engine can be similarly utilized in any domain.

The a priori AI engine does not use evidentiary data required for the formulation of the AI. The knowledge and understanding have to exist before any data is provided. This is in stark contrast to current AI engines in the market, which use a posteriori AI that is more commonly prevalent and is entirely dependent on data and experience.

The AI required for the a priori AI engine cannot be ascertained from the interaction between users and the system. Much of the intelligence is knowledge and understanding that is not part of this interaction but is contained in the structures and morphology behind the interface. The totality of the understanding of requests by the a priori AI engine is not contained within the conversation with a user.

The a priori AI engine cannot be reduced to a set of rules. This may make the system entirely deterministic, which it is not, and may require the system to consider so many cases that it can be practically infinite in size.

Additionally, in a rule-based system, a rule must be given for every case. In any non-trivial system, it is not possible to cover every potential scenario that may occur, as per Gödel's incompleteness theorem. In the a priori AI engine, the AI can ascertain the rule, intention, and action for all cases.

It is asserted that concepts are known and understood first and that language evolves to describe these concepts. Consequently, we do not begin with language at all, but rather, we imbue the system with an understanding of travel logistics.

The a priori AI engine may essentially deal with the conversation itself, not just the content of the conversation. Thus, each conversation initiated by either the user or the system may have a number of essential parts. Specifically, the conversation may have an objective or goal. For example, the objective may be the building or modification of an itinerary. The objective may be a response from the user to a question posed by the system to the user dealing with errors, or the like. Furthermore, each of the conversations may have a state, such as awaiting answer, completed, and the like. As would be understood by a person of ordinary skill in the art, many types of conversations can exist at the same time for a given user.

The AI engine 210 may employ a combination of phraseology and keyword inference (Step 415) to decode what type of request is being made. Specifically, the AI engine 210 may determine the itinerary components by decoding the itinerary components from the travel request by determining phrases and tokens of the travel request. The AI engine 210 may reference the metadata database and the equivalence class database. Keywords included in an AI pattern recognition database may direct the AI engine 210 to appropriate content categories for the itinerary components included in the request (Step 420). The AI engine 210 may employ additional inferential methods as well as statistical methods and frequency to determine where and how to match content to the request.

The parsing module 205 may evaluate each word of the sentence. If no keywords are found, nothing is constructed. However, the AI engine 210 may employ a "similar to" inference functionality which allows for variation among the phraseology to account for different ways that natural language queries may be structured such as incorrect spelling, grammar, and similar contingencies.

Once the parsing module 205 has determined the itinerary components included in the natural language travel request, the parsing module 205 determines a node type for each of the itinerary components and ascertain dependencies between each of the itinerary components based upon respective node types. It will be understood that the parsing module may effectuate construction of itineraries in a variety of manners. For example, the parsing module 205 may parse the words of the request in a sequential manner. The parsing module 205 may also parse the request to determine categories of itinerary components included in the request. In other instances, the parsing module 205 may delimit the request.

The method for fulfilling travel requests of the present disclosure utilizes an itinerary network graph with nodes and dependencies. Specifically, according to some embodiments, the parsing module 205 may utilize a directed acyclic graph (DAG), also referred to as an "itinerary network," to interpret natural language queries. The information extracted by the parsing module 205 may be utilized to generate an itinerary network that provides a further dynamic intelligence to the parsing module 205 in understanding the requested, parsed information, and assist the parsing module 205 in determining possible logical and logistics connections (e.g., location, time, and traveler preference based dependencies). Therefore, the parsing module 205 may generate the itinerary network based on the itinerary components of the travel request. Specifically, the parsing module 205 may create a plurality of nodes within the itinerary network. Each of the plurality of nodes may represent information associated with the travel request. The parsing module 205 may further create a plurality of edges within the itinerary network. Each of the plurality of edges may connect two of the plurality of nodes. The plurality of edges may represent an order of the plurality of nodes in time based on dependencies between the plurality of nodes.

The parsing module 205 may generate a travel itinerary responsive to the travel request. The travel itinerary may be consistent with the itinerary network. The parsing module 205 may present the generated travel itinerary to the user on a user interface of a computing device associated with the user.

The nodes may be of different types and may store information about the itinerary. The nodes may represent cities, hotels, flights, and destination content (such as a concert or car rental). The nodes can contain information specific to the type of node. For instance, a city node may contain an airport, whereas a flight node may contain the class of service.

Edges connect nodes to show dependencies between nodes and may contain information themselves. The edges are directed to represent the order of nodes in time. In one example embodiment, edges can be air transport, car transport, start to start, or start to finish. In other words, the edges can present information that may be important when scheduling the itinerary.

If a user expresses a desire to travel between two cities, an itinerary network can be used to represent this travel request of the user. To create the itinerary network, two city nodes may be created first: one for the source city and one for the destination city expressed by the user. The city nodes may be populated with the names of the cities in the user request and possibly names of airports. Then, these cities may be connected with a directed edge (dependency). The edge may contain information for a flight, rail, bus, or other mode of transport between the two cities, as well as other information, such as the scheduling type. In some cases, for example, in multi-passenger scenarios and situations where dependencies between passengers arise, the mode of transport may be presented as the node type and may be further qualified in the dependencies between the city and the transport node.

If the same user expresses a desire to travel between two city pairs, this process may be done twice. It may be incorrect logistically and logically to put one person on two flights departing at the same time. In view of this, the first condition is that each passenger must have a path-connected graph. The second condition is that the graph is acyclic. The a priori AI engine understands that the itinerary network is a compact path connected topological space, with all the mathematical tools and theorems that follow from that at disposal of the a priori AI engine. This allows the AI to fully understand the properties of the itinerary network and to know if the path connectedness property is broken and how to resolve it by communication with the user. This understanding is naturally inherent within the systems and the methods of the present disclosure and it has been built into the a priori AI engine.

The itinerary network provides a coherent consistent entity that can then be treated by a scheduler for scheduling of a travel request. More than this, the systems and the methods of the present disclosure cover every case one could glean from data or experience, without having to input a multitude of individual rules to teach the a priori AI engine.

The resultant itinerary network contains all of the information necessary for the system to supply congruent content (logistic and curated data). The characteristics of the itinerary are the characteristics of a path-connected, directed acyclic, compact topological space or combinations of such spaces. This provides the capability of scheduling the itinerary in a consistent and coherent manner. It also allows the parser to understand all the aspects of the itinerary.

The itinerary network may describe the itinerary, such as flights, hotels, cars, events, reservations, and other disparate content. The itinerary network also describes the temporal and dependent relationships of the passengers and their content. The understanding of the itinerary depends on the scheduler, which instantaneously understands the logistics and content of the network. The parser may be imbued with the lexicon and capabilities of the itinerary network and as such can understand and interact with the itinerary network independently or through conversations with the user.

All of these described elements are part of the a priori AI engine directed to not simply understanding language. In fact, the language is an insufficient condition to the AI of the system. The a priori AI engine may inform what language is to be understood and what language is not relevant.

Goal Orientation—Seeking.

The a priori AI engine may use the parser, the scheduler, and so forth, to seek to fulfill an itinerary request. For this purpose, the a priori AI engine may build an itinerary network and schedule the itinerary network with appropriate curated content. The parser may use the tree of nodes (parser trees) to address any conversation that seeks to instruct the system to build or modify any itinerary.

In some instances, itinerary components may comprise travel or non-travel node types. For travel node types, the parsing module 205 may obtain source and destination information from relevant itinerary components (Steps 425 and 430). If they do not exist on the itinerary network, the parsing module 205 may add them to the itinerary network. For non-travel nodes, the parsing module 205 may determine if the node has a time or location dependency to another node (Step 435). If the node does have a dependency, the parsing module 205 checks to see if the dependent node exists. If it does not, the parsing module 205 will create the node and populate the node with any necessary attributes (Step 440).

According to some embodiments, the parsing module may also identify traveler preferences. Traveler preferences can include general or specific preferences and are requested or ordered in natural language. Some examples include: "give me cheapest flight," "do not book me into any Hilton hotels," "provide me four-star hotels or better," and "If I am in San Francisco book me into the San Mateo Sofitel hotel."

The process of identifying nodes for itinerary components and interrelating these nodes may be referred to as generating an itinerary network. The itinerary network may be utilized by the scheduler module 215 to generate an unconstrained schedule for the natural language request, as will be described in greater detail herein.

The characteristics of an itinerary may include a stage, a state, and a context. These characteristics allow the parser to be sentient in the conversation with the user through the life cycle of the itinerary (pre- to post-booking and change management) and partial completion of the itinerary. The sentience includes understanding the meaning of the request (based on from context, stage and state). The goal orientation of the system may be to serve an itinerary request. The stage may include a pre-booking state and a post-booking stage. The stage is important for establishing the context, as well as for communicating relevant information to a user, such as change and cancellation fees or other disruptions to the itinerary as a result of a change or delay.

The state is broadly defined by two elements, namely the itinerary network and the conversation. The state includes determining, for example, whether the system is conversing with the user about the itinerary, whether the user has booked a trip, whether there are flags on the itinerary that need to be addressed (such as incomplete information or infeasible solution), and so forth.

Context may be built into an itinerary object. This may provide sentience to the AI engine as the AI engine interprets new requests or changes for the itinerary. The context may be dynamic as the itinerary object changes its stage, state and topology. As one can easily see, traditional machine learned artificial intelligence simply cannot cope with dynamic context because the number of experiences is an NP-Complete decision problem, even a higher order of complexity than NP-Hard decision problem.

It should be noted that all of the machine learning/neural network type processes around natural language by their construction must infer the semantic meaning from language data that is input into the neural network and trained on the semantic meaning. In "The Language Complexity Game (Artificial Intelligence)" by Eric Ristad, The MIT Press; First Edition (Mar. 17, 1993), it is argued that language is the process of constructing linguistic representations from the forms produced by other cognitive modules and that this process is NP-complete. However, neural networks and other statistical-based inference models as a technology do not rise to the complexity class required to solve NP-complete problems. It is undeniable that they can make inferences with some accuracy, e.g., when being shown one million examples of a number 5, the neural networks and other statistical-based inference models will pick a 5 out 99% of the time correctly when shown numbers. When noise is introduced into the neural networks, the neural networks may still infer, with the same confidence, that a static page before a user is a number 2. When being asked by a user to draw a 5, the neural networks cannot answer the user. Thus, the structure of conventional neural networks is incapable of doing anything other than returning a probability.

The a priori AI engine described herein changes the problems complexity class from NP-complete to order kN. The a priori AI engine is imbued with knowledge of travel, and language does not need to be inferred, language needs only be matched as the set of language patterns are generated by the capabilities and understandings of the underlying morphology/referential framework. In this sense, the behavior of the a priori AI engine is totally unique in the ecosystem of natural language human machine interfaces.

Figure 5:
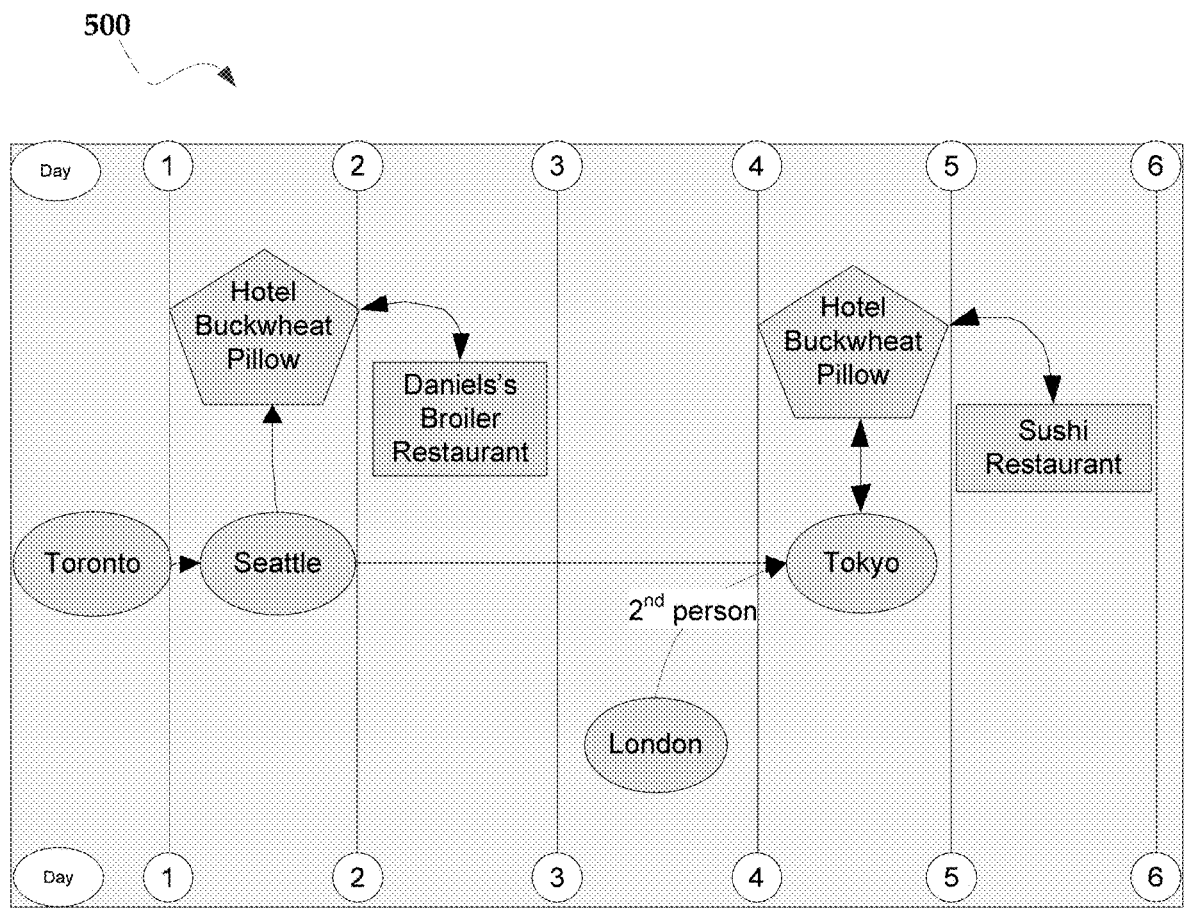
FIG. 5 illustrates an exemplary method for notifying suppliers of a natural language travel request.

It will be understood that the parsing module 205 may generate an itinerary network in any order, allowing itinerary components to be inserted into the itinerary network when a starting/ending reference point has been established, such as when the source and destination itinerary components are identified. An exemplary itinerary network 500 is illustrated in FIG. 5, and is constructed from the natural language travel request, "From Toronto to Seattle. From Seattle to Tokyo. Stay at any preferred hotel with a buckwheat pillow. Reservations at Daniel's Broiler and a well-known sushi restaurant near my hotel in Tokyo."

Additionally, the following traveler preferences that were received in natural language format include: "Give me lowest cost tickets," "Exclude Hilton chain," "Route me through Cincinnati on route to Seattle," "Integrate my calendar and exclude red category," as well as many other traveler preferences, which would be known to one of ordinary skill in the art with the present disclosure before them.

Additionally, the parsing module 205 may populate each itinerary component with attributes identified by the AI engine 210, such as node type and dependencies.

The parsing module 205 may then establish dependencies between appropriate itinerary components. There is an extended set of dependencies that extend from the normal start-start, start-finish, finish-start, and finish-finish to parent-child, local dependency, and so forth. Other exemplary dependencies may include, but are not limited to: Air-Connect, Local-Connect, Activity, Location, Time, Time and Location, Logical-Connect, and dependencies that relate to the travel data of another traveler such as "Travel Together" and "Travel Meet At."

Time dependencies may be utilized to generate itinerary schedules in reverse order, based upon an end point. For example, using a scheduled meeting as an end point, the present technology may create and fulfill a travel itinerary for a customer that ensures that the customer arrives in the proper location and at the proper point in time to allow them to attend the scheduled meeting.

Once node types and dependencies have been established for the itinerary components of the natural language request, the parsing module 205 may generate an adjacency matrix using the itinerary components and their respective dependencies. Utilizing the adjacency matrix, the parsing module may create an itinerary network using the adjacency matrix.

Next, the parsing module 205 may determine a topological ordering of itinerary components using the itinerary network. It is noteworthy that the topological ordering of itinerary components may comprise an arrangement of the itinerary components using their respective location and time dependencies used by the scheduling module 215 to generate an unconstrained schedule, as will be discussed in greater detail below.

Conceptually, the parsing module 205 and AI engine 210 may utilize the itinerary network to inform the scheduling module 215 in generating schedules and allocating inventory to the schedules. For example, if an itinerary node includes an activity, or location dependent node such as a theater, restaurant, hotel, conference, or the like, the parsing module 205 will understand the activity must take place in a city. Thus, depending on the phraseology encountered by the AI engine 210, the AI engine 210 may loop through the admissible ways of saying "I'm here" and compare the location against a city dictionary list. If the city is valid, the AI engine 210 may look for the city name in the itinerary network, creating a node if the AI engine 210 does not find an appropriate node or adding the activity node with a time/location dependency underneath.

Dependent activities may have their own dependencies as well (for example, local transportation between a restaurant and a conference). Moreover, preferences associated with each dependent node may appear as another level of dependency (for example, a buckwheat pillow in a hotel room).

At each level, the parsing module 205 may check to see if a desired node is present in the itinerary network and create nodes as needed. Since each city and activity has a time dependency as well as a location dependency, in complex itineraries with multiple cities being visited multiple times by multiple people, the parsing module 205 may prevent confusion relative to a dependent node's dependencies relative to location and time. The parsing module 205 may also inform the consumer that he has asked for a hotel in a city to which the consumer is not traveling.

If the parsing module 205 determines a travel phrase or keyword, the parsing module 205 may infer there must be a source and destination and a mode of travel therebetween. The parsing module 205 may further infer what kind of travel is most appropriate, so a consumer will not find himself driving or taking the train from Miami to Manchester, U.K.

The parsing module 205 may not dictate a mode of travel; however, a consumer may choose to take any form of transportation desired. The parsing module 205 may send the phrase to the AI engine 210, extract the source and destination cities, match them against the city list dictionary, and check the network for the nodes existence and add them if necessary. The AI engine 210 may then add the travel node and a travel dependency between the travel node and the two cities to the itinerary network.

Therefore, a consumer may ask for any itinerary, in any order, and the present technology may produce a correctly networked schedule. For example, the present technology may take the natural language phrase, "I want to go from Seattle to Dallas, Miami to Atlanta, Dallas to Miami, Toronto to Seattle." The parsing module 205 may create an itinerary network which linked Toronto to Seattle to Dallas to Miami to Atlanta. As before, additional content nodes and dependencies may be added as required.

The parsing module 205 may understand the different types of dependencies that occur. For instance, in Toronto there may be an Italian restaurant called Pizza Banfi. If a traveler preference indicates a hometown of Toronto, or location-based data from a consumers' cellphone indicates that the consumer is in Toronto, and consumer requests "From Pizza Banfi to Seattle," the AI engine 210 may understand that the consumer requires transport between two points, but that one point is a city, and the other is a dependent node belonging to another city. The AI engine 210 may create the Toronto node, place the restaurant as a dependent node, arrange for transport to the airport, which is local dependency, a flight dependency between the two cities right after it creates the Seattle node.

The scheduling module 215 may be executed to generate an unconstrained schedule from the itinerary network (e.g., DAG).

The generation of an unconstrained schedule establishes the earliest start and latest finish for all nodes and hence the initial starting point for all requests pertinent to the content represented by the nodes. The scheduling module 215 then employs one of several methods to resolve the allocation of content (e.g., inventory) to the requests for content and fill the itinerary.

The scheduling module 215 may apply an Adaptive Method that "levels" the itinerary. For example, the scheduling module 215 may search content within the topological ordering. Each line item in the topology may be considered, the exchange searched, and/or offers obtained from the suppliers. The content request is established by the scheduling module 215 from the node type and its attributes as filled out by the parsing module 205. These attributes also include general and specific preferences. A set of valid options may be obtained and ordered by the traveler preferences.

Further, the scheduling module 215 may employ additional methods to allocate inventory to the request. In a "best alternative" mode, a best alternative (e.g., available inventory) is selected that comprises the content selection that is at the top of the list sorted by traveler preferences This then sets the starting conditions for successor nodes in the topology and the topology is then recursed by the scheduling module 215 using only the best client alternatives. In some instances, a specific best path itinerary can be identified.

Additionally, the itinerary can be optimized with respect to an equivalence class of airline tickets, where the result from selecting a specific airline ticket does not impact the remainder of the itinerary.

In an "all possible" mode, each alternative (up to some arbitrary limit) of the sorted list of nodes by client preferences may be considered by the scheduling module 215 and a separate itinerary developed for each. The scheduling module 215 processes each line item in the topology by applying a recursion algorithm.

The results of this modal process may generate many different itineraries whose costs and time frames can vary substantially. These itineraries may be sorted in different ways using multiple sorting criteria; (shortest, lowest cost); (lowest cost, shortest); and so forth. The scheduling module 215 can dynamically schedule robustness into the schedule in the sense that it can maintain specific times required between flights; these can be in minutes, hours or days. The scheduler will automatically extend hotel stays if the flights do not leave on the same day as the hotel checkout.

The scheduling module 215 may create time and space dependent solutions to the logical schedule dynamically, based on the offers made to the requested itinerary from suppliers. The scheduling module 215 maintains the dependencies so that requests remain accurate with respect to the current solution. In this manner, the logistics of travel are maintained and their constraints adhered to.

The scheduling module 215 may be configured to always return a solution, even if the constraints cannot be met. This solution may comprise the closest available under the constraints and options that have been requested. It is noteworthy that when inventories for content are tight, it could take an extremely long time to find any solution. Therefore an "approximate fit" schedule may be preferred to no schedule.

The scheduling module 215 may be configured to generate a leveled solution where the scheduling module 215 may allow requests to level out in time across the itinerary, showing when solutions are available. Thus, if a customer books a flight today to San Francisco, the scheduling module 215 may allow a solution for tomorrow if that is the only alternative.

The scheduling module 215 may also provide one or more possible schedules (solutions) to the exchange 105 (FIG. 1) in either a sequential or leveled manner. In the sequential method, all dependencies for a specific aspect of the itinerary may be filled before it is submitted to the exchange 105. An alternative method allows the scheduling module 215 to maintain the times and dates specified, and only offers that match these times and dates are allowed.

Figure 6:
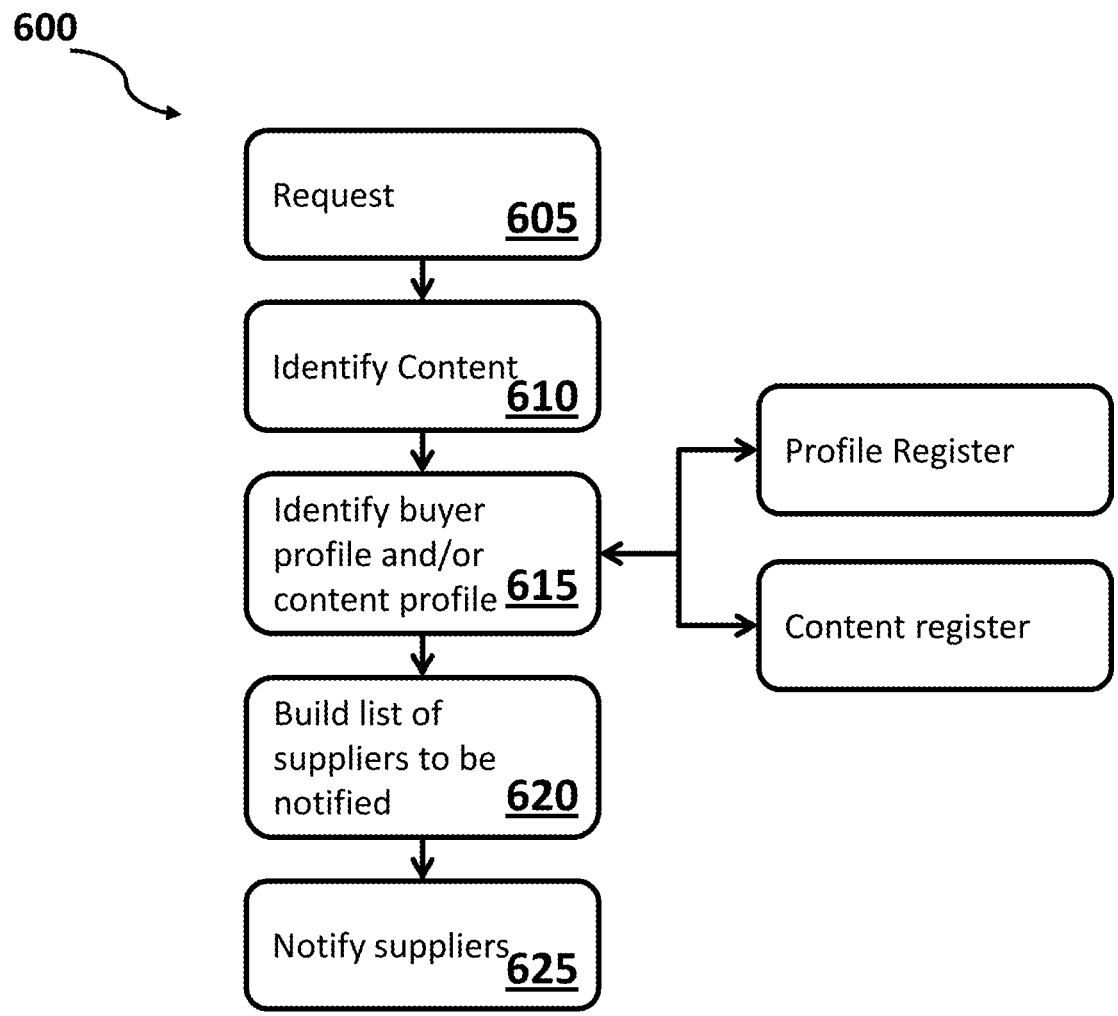
FIG. 6 illustrates an exemplary flow diagram of a process for fulfilling a schedule.

Referring now to FIGS. 2 and 6 collectively, the scheduling module 215 may transmit itinerary components and/or entire itinerary schedules (such as the itinerary network) to the exchange 105. The exchange 105 may employ a listener that immediately picks up the new requested line item or itinerary (Step 605). Line items or an itinerary may also be referred to as a "request." The listener may identify the itinerary components (nodes) (Step 610) and/or a buyer profile or content profile associated with the itinerary (Step 615). The listener may compose a list of the suppliers that have indicated that they want to bid on these types of line items or itineraries (Step 620). Suppliers may be notified of these requests and can then analyze them and bid on them or entire itinerary (Step 625). The transactions made available to the suppliers contain the entire content, inferential information, and/or semantics of the request together with a framework for interpreting the same. The supplier can respond based on review of its inventory and availability. In other instances, the supplier can dynamically decide what to do with the content and price through its own legacy systems. Alternatively, the exchange 105 makes available APIs to interrogate the system for any requests that the supplier may want to look at (For example, City-Pair for flights and/or Activity Keyword or partial Keyword). In some embodiments, the default listener is the exchange itself that will process, search, and respond to every request.

Offers may be written back to the exchange in the form of a response. Additionally, suppliers can respond with any additional content they desire, together with pricing for itinerary components. For example, an airline can offer a golf bag at $100 with the air ticket at a reduced price. Other similar types of vouchers may be exchanged or facilitated utilizing the present technology.

As offers are written to the exchange 105, they are matched against the line items and itinerary generated by the scheduling module 215. In some instances, before being considered, the offers may be passed through a set of filters that describe the traveler's restrictions and preferences. An exemplary flow diagram of a process 600 for fulfilling a schedule (e.g., request) is depicted in FIG. 6.

According to some embodiments, the scheduling module 215 may selectively adjust the allocation of inventory based upon various constraints such as available/dynamic inventory. In other embodiments, the scheduling module 215 may adjust the schedule provided to the consumer based upon inferential modeling of the consumer's request (for example, when the consumer expresses a traveler preference that is new or contradictory to a known traveler preference for that particular consumer).

According to some embodiments, the modification module 220 may be executed to process modifications to travel itineraries. Generally speaking, the modification module 220 may receive a modification to the travel itinerary from a traveler who has previously input a natural language travel request that has been processed using the aforementioned methods to generate an itinerary schedule.

The modification module 220 may adjust the allocation of available inventory for each itinerary component remaining in the travel itinerary based upon one or more dependency adjustments associated with the plurality of nodes and the plurality of edges and caused by modification of the travel itinerary. That is, because the parsing module 205 appreciates the dependencies between the current itinerary components in the schedule, along with the dependencies of the modification, the parsing module 205 may insert the modification into the schedule and adjust other itinerary components, as necessary. Therefore, even for an itinerary that is currently being executed (e.g., traveler has already completed at least a portion of their itinerary), the parsing module 205 may adjust the schedule to ensure that traveler preferences are maintained. For example, if cost is an important traveler preference, the parsing module 205 may adjust the schedule to cause the least impact from a cost perspective.

The parser trees may define a priori AI engine that can deal with any conversation seeking to build or change itineraries through successive iterations of the conversation—all in place before the first ever conversation takes place. Furthermore, no rules are required; rather, the understanding is fundamental and complete in advance of the conversations or requests with users.

The itinerary network may handle the language interface between the user and the system. The itinerary network also facilitate interactions between various elements of the system itself. The network nodes may be comprised of tokens. The paths (sequence of tokens) in the itinerary network are called 'phrases'. Together, the tokens and the phrases may make a normalized travel language or meta language. This is strictly a pattern (or phrase) recognition process; no traditional linguistic grammars are used in this process. This is a departure from traditional Natural Language Processing methods which rely heavily on the linguistic syntactic composition of a sentence and data to learn relationships between the various syntactic elements. The system is able to construct the phrases without ever having to have experienced them.

Tokens are the categorization of information related to travel. For example, the tokens may include travel attributes related to the travel request, such as passengers, source and destination cities, times and dates, time and date restrictions, hotel names, addresses, and other descriptive elements, such as dependencies between the various itinerary network elements. A phrase is an ordered set (or sequence) of tokens that describes an intention, request, or like communication with the system (parser). In effect, the entire conversation related to the itinerary may be pre-defined in this manner. All travel conversations and their intent, regardless of context, and the like, can be reduced to a normalized set of phrases in the parser trees.

Figure 7:
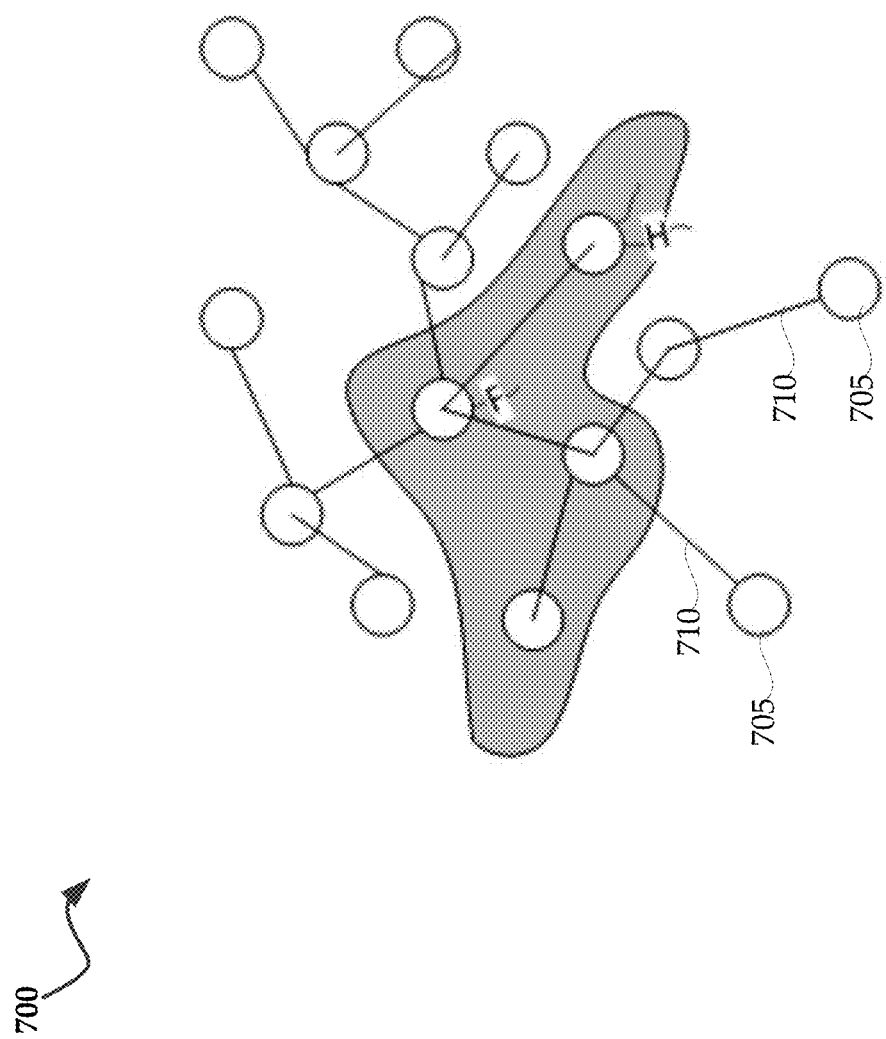
FIG. 7 shows an itinerary network, according to an example embodiment.
Figure 8:
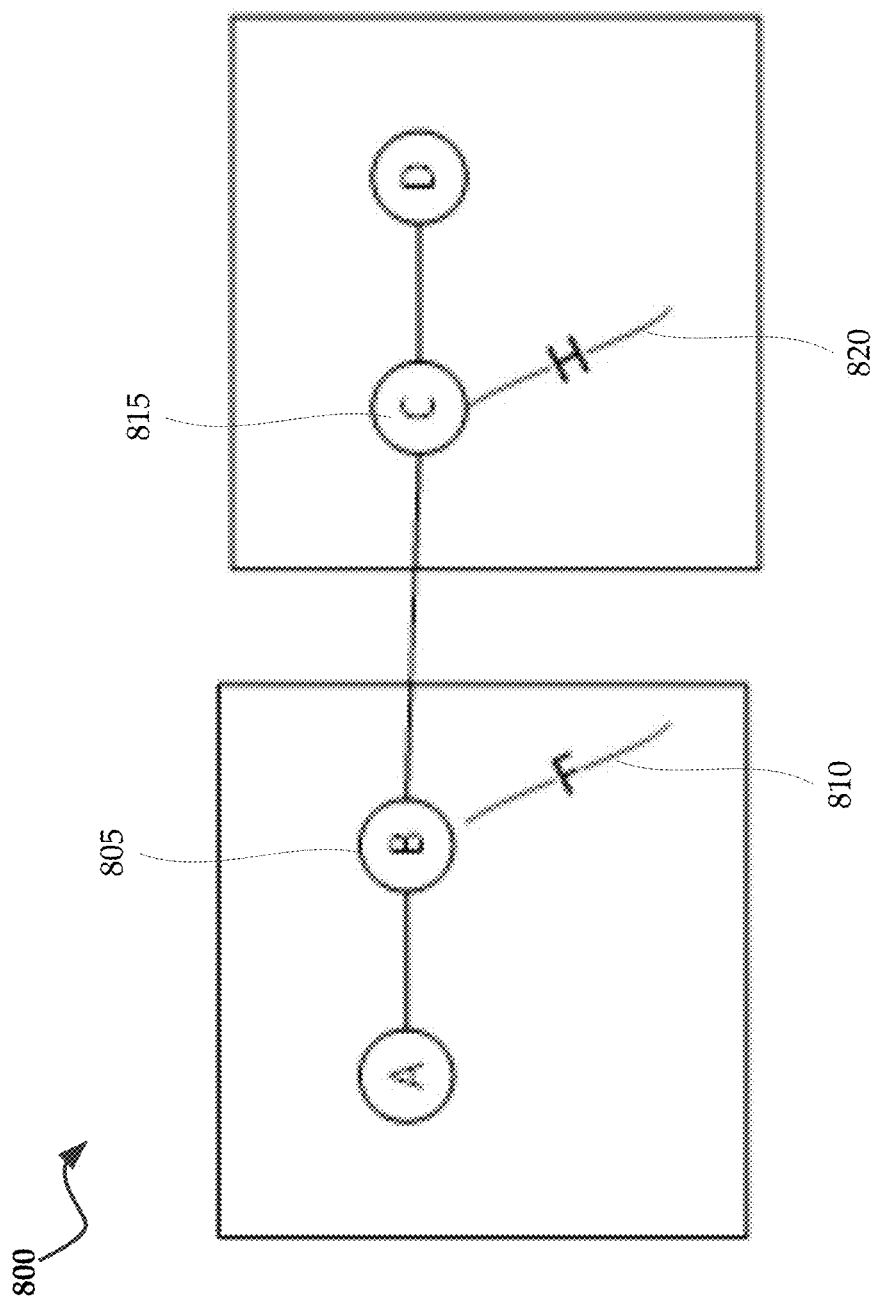
FIG. 8 shows a sub-path of nodes of an itinerary network, according to an example embodiment.

FIG. 7 shows an itinerary network 700, according to an example embodiment. The itinerary network 700 may include nodes 705 and edges 710. FIG. 8 shows a sub-path of nodes of an example itinerary network 800. The nodes may have annotations. A node 805 may have an annotation 810, and a node 815 may have an annotation 820. Each node in the itinerary network 700 or 800 can have one or more annotations 810 and 820 associated with it. The annotations 810 and 820 may describe specific information or understanding. For example, the node 805 may have the annotation 810 'flight'. This annotation may mean that there is sufficient information (within the path or network subtree reaching the node 805) to determine that there is an intentional request for a flight. The AI engine understands this information together with the data associated with the flight. Another sub-path may add additional information to an existing node or define a global requirement or preference or a change to the existing itinerary network. As these tokens from the conversation are processed (for this example, in sequence), the sequence may be matched against a sub-path in the parser tree.

The system may be configured to perform error handling and the ability to anticipate "next" likely token(s). Specifically, at any stage in matching the ordered set of tokens obtained from the request, the parser already knows the set of next possible valid tokens of the travel request. This is significant because the parser can detect insufficient information to fully understand a request, as well as missing information (tokens) necessary for generating the travel itinerary. Based on the possible next tokens, the system may detect insufficient information associated with the travel request and request the insufficient information from the user.

An Example of Building a set of Phrases using the Parser Trees.

Once a match for a sub-path with an annotation is obtained, there is created an immediate and absolute "understanding" and a potential actionable event. The nodes in the sub-path may not have any physical resemblance to what was understood or inferred or the actionability thereof. This constitutes an a priori AI engine. The a priori AI engine has understanding before there is any specific request and is general in nature, and the a priori AI engine requires no data for this understanding; rather, it can handle any such request associated with the sub-path. Indeed, the capabilities of the itinerary network and scheduler define the phrases in their totality. Additional phrases, when encountered, merely constitute an equivalence class relationship with an already extant phrase.

For example, as shown on FIG. 8, at the stage B, the node 805 may have the attribution of a flight that means that the parser has intentionality to define a flight. At stage C, the node 815 may have the attribution of a flight that means that the parser has intentionality to define a hotel. The system understands that what is requested is a flight and a hotel. The set of nodes leading up to this provides sufficient and necessary logical information to create a flight. Now an actionable phrase may start. This phrase invokes an action, for example, called "Build Flight and Hotel." This action builds a travel itinerary and the itinerary network, which represents the travel itinerary in a unique manner. To build the itinerary network, the system determines content nodes, city nodes, city children content, the relationships between the nodes, the dependencies between nodes, the ability to represent multiple travelers, and so forth.

The Parser Complexity Class.

The cardinality of the set of equivalence classes is finite, countable, and has N members. This set may form a compact cover of the set of actions, requests, information, and so forth defined by the system. The equivalence classes, which provide equivalent ways of stating any phrase, form a larger open cover 905 as shown on FIG. 9 and discussed below. The complexity class of the a priori engine may be <O(kN), where N is the finite number of equivalence classes (i.e., the finite number of statements about the travel itinerary possible to be made) and k is the maximum number of the equivalence classes of the statements. This holds true regardless of how many times phrases are matched in the parser trees or the size of the context in which they are made.

Figure 9:
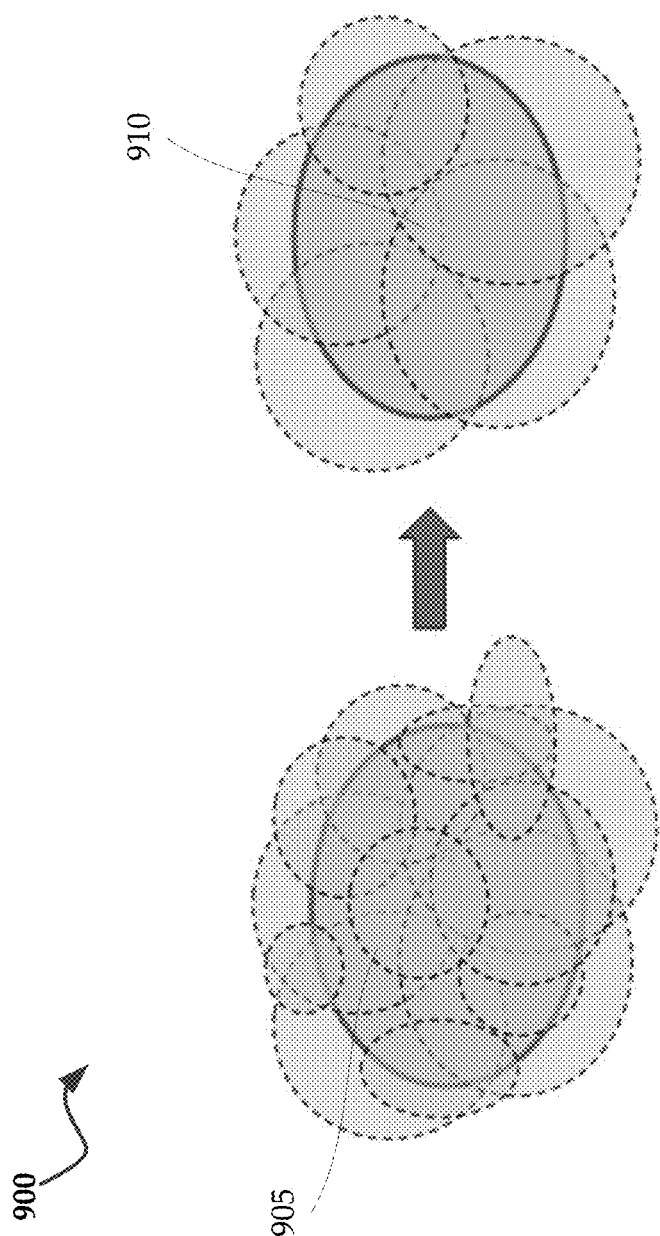
FIG. 9 shows a parser network as a cover for travel conversations, according to an example embodiment.

FIG. 9 shows a parser network 900 as a cover for travel conversations, according to an example embodiment. While the normalized set of phrases form a compact cover 910 of the intentionality space for travel, each phrase can have a set of like phrases that are equivalent to the single member phrase of the compact set and form an open cover 905. For example, "I want to go from YYZ to MIA" is equivalent to "I want to go to MIA from YYZ". While the set of phrases is O(N) complexity class, the compact cover 910 together with the equivalence classes form a complexity class of O(kN). This is extremely important since most other AI technologies are essentially NP-complete.

Building the Itinerary Network.

The natural language request of the user may have the following form: "I want to fly from Toronto to New York staying 3 days upper west side in a 5 star hotel then go to Miami staying in South Beach for 2 nights then to San Francisco staying at the Sofitel on Twin Dolphin drive for 2 nights then home. Business class tickets on all flights. Jonathan will join me in San Francisco stay at the same hotel and we will share a room. He will then go to Seattle stay at the Woodmark Hotel in Kirkland for 3 days then fly home." The request may be processed into meta patterns (phrases) and these phrases may be used to build a directed, acyclic, path connected network, which in turn may be used to build a resource independent (logical and resource unconstrained) schedule.

The goal of the system includes finding suitable content for this itinerary as defined by the itinerary network. The itinerary network may provide the context both when constructing the itinerary network for requests from the conversation, as well as when creating the goal for the system, namely, to fulfill this travel itinerary network. In this manner, travel requests and successive requests may define the itinerary network and the system may always act to fulfill the itinerary network, whether by creating a new itinerary network or changing an existing itinerary network. This iterative process can continue indefinitely without human intervention. The system may be automatically goal seeking and the AI engine may be synthetic and analytic a priori (i.e., no data and/or experience may be required for the AI engine).

Figure 10:
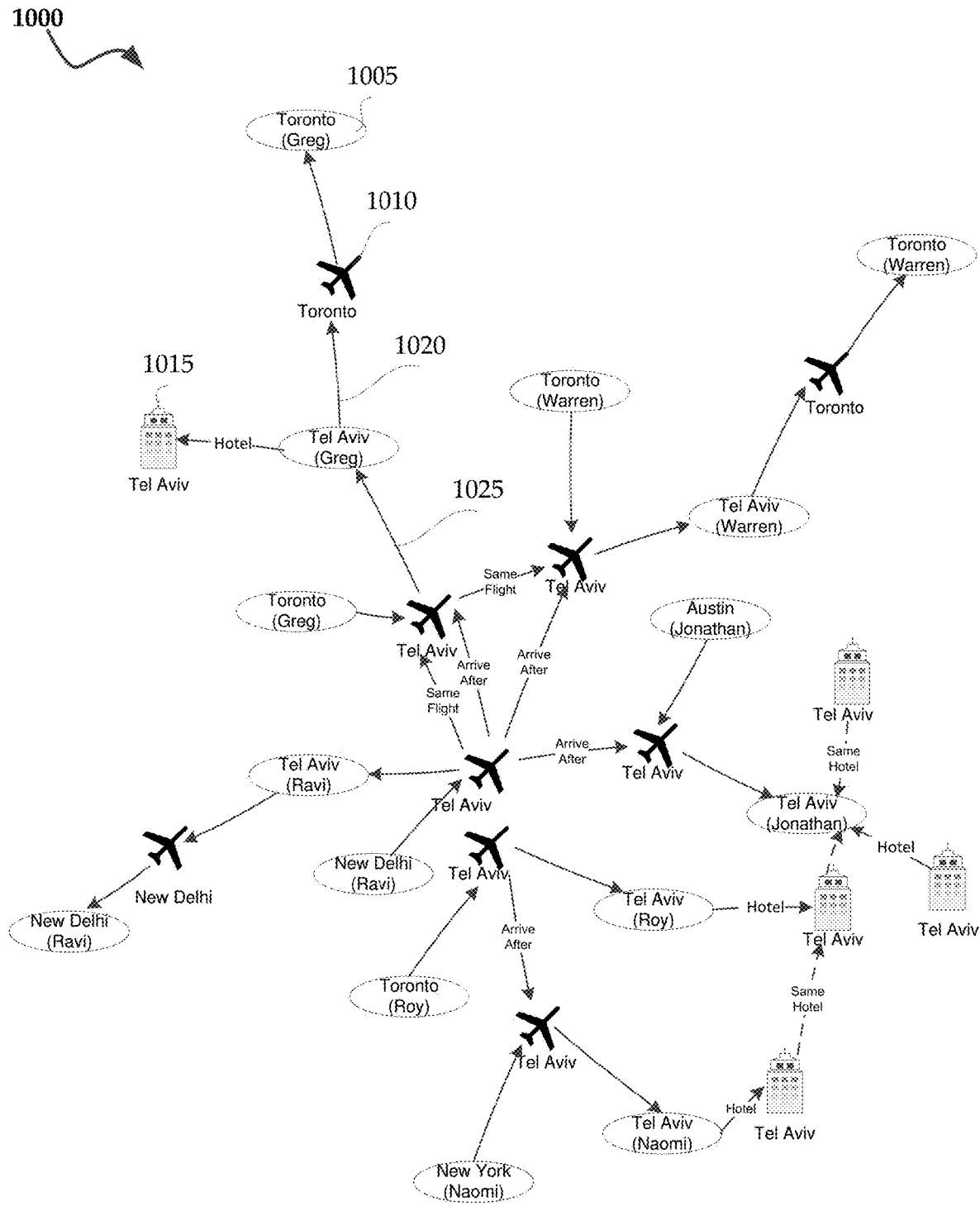
FIG. 10 shows an itinerary network, according to an example embodiment.

An example itinerary network 1000 is shown in FIG. 10. The itinerary network 1000 may have a plurality of nodes 1005, 1010, 1015 associated with flights, hotels, cities, and so forth, and a plurality of edges 1020, 1025 that connect the nodes.

Properties of the Itinerary Network.

The AI engine may consequently deal with multiple states that occur over the lifespan of the travel itinerary. The AI engine also understands the properties of an itinerary object. For example, the AI engine may understand that the itinerary object is a compact path connected topological space. When the path connectedness property is broken, the AI engine understands the implications of this and how to deal with it by communicating with the user. This understanding is naturally inherent to the AI engine and the methods of the present disclosure.

The itinerary network may provide a coherent consistent entity that can be treated by the scheduler with a single set of methods and provide a scheduling AI ecosystem for the scheduling of the travel request. The AI engine is aware of the context of the travel itinerary, namely a stage, state, and all the methods and attributes the itinerary network represents. The resultant itinerary network contains all the information necessary for the system to supply congruent content (logistic and curated data). The characteristics of the itinerary are that of a path-connected, directed acyclic, compact topological space, or combinations of such spaces. This provides the capability of scheduling the itinerary in a coherent manner and allows the parser to understand all the aspects of an itinerary with respect to nodes of the itinerary network.

The Construction of Parser Network Trees.

Normally, one considers natural language as the mechanism to interface with a user and the machine. Natural language parsing is complicated and requires correct linguistic grammar to interpret the request. This is difficult enough and subject to the ambiguities of language, as well as because people do not often speak grammatically correctly. Regardless of the ability for the natural language parsing to parse a request into a grammatical structure (subject, objects, verb, clauses, etc.), the ability for the system to actually understand the context and intent of the spoken word is complex. Traditional methods for AI use language through inference and large amounts of data (experiential) to determine what the intent actually is. Complex statistical methods in the end just give probabilities that the spoken sentence means a specific thing. For example, in conventional natural language parsing systems, in response to "I want to fly to Montreal next Tuesday" the conventional natural language parsing system replies, "There is a 94% likelihood that you want to take a flight to Montreal next Tuesday." Furthermore, no context of the conversation is determined by the conventional natural language parsing system.

Building a Priori Parser Tree(s).

The parsing may be fully integrated into the system, methods, and all the conversations that exist between the modules of the system, the state, and stage of the itinerary, the error conditions together with the conversations that may exist between the user and the system.

The a priori engine may be, in fact, built in reverse order to the traditional model. All the goal seeking methods may be defined, given context in terms of the itinerary object, and then the specific phrases (meta language) may be defined in these terms. The a priori engine may include the itinerary network, the parser network and the phrases and the lexicon required to drive them. The set of phrases may be a compact cover of the truthful statements that can be made within the tautology of the a priori engine. The AI engine can be easily extended to cover new methods, lexicon, and phrases, without experimentation or any data sources.

Since the AI engine has to be constructed from known structures and methods, the AI engine cannot be learned via experience or data model. The a priori engine may comprise a set of phrases which are understood explicitly in terms of their respective goals/objectives, information content, queries, and the like. The phrases are understood in context of the current state of the itinerary, supply chain, and so forth.

Embodiments of a computing system discussed herein include providing end to end digital service, where the AI engine extends through understanding of a request from a user, the goal seeking properties of constructing a congruent itinerary, modifying the itinerary, curating the content for each user, maintaining context and sentience, and seeking to complete goals.

The AI engine discussed herein can be implemented via a specially-programmed and special-purpose computer. The computing engine may utilize one or more processors storing instructions, static and/or dynamic memory, one or more databases or other data structures, and network interface(s).

Figure 11:
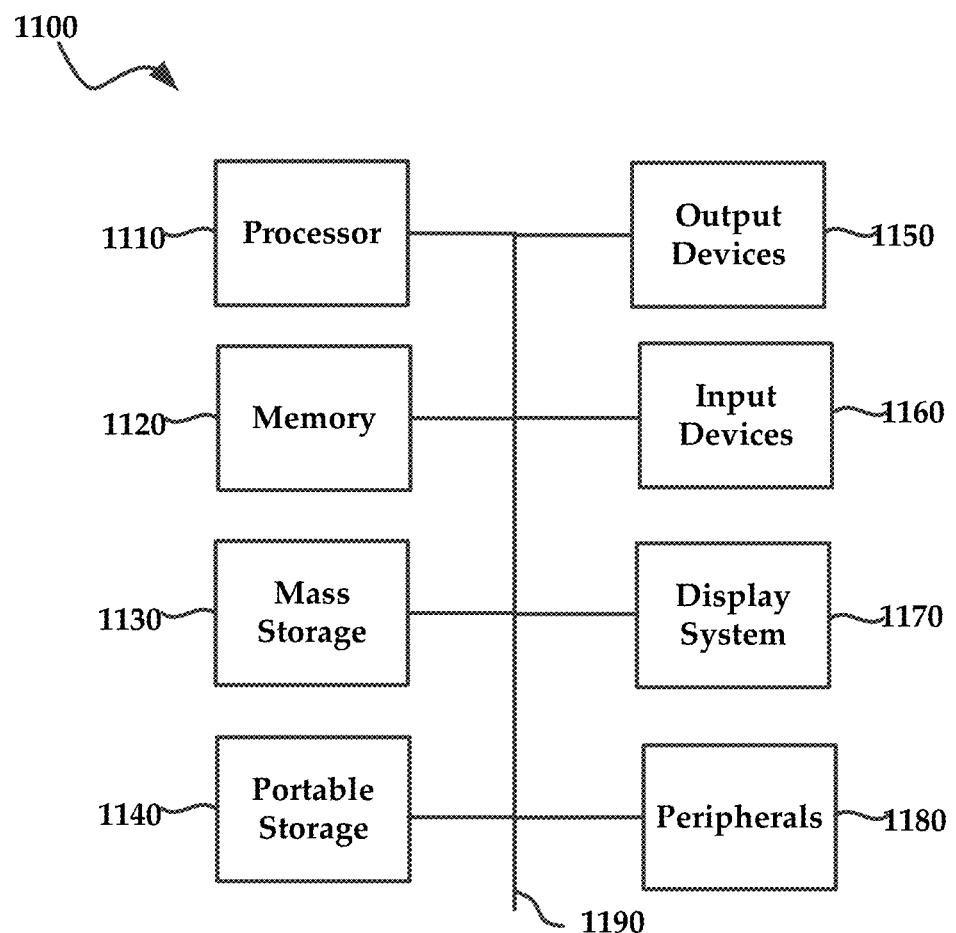
FIG. 11 is a block diagram of an exemplary computing system for implementing embodiments of the present technology.

FIG. 11 illustrates an exemplary computing system 1100 that may be used to implement an embodiment of the present technology. The system 1100 of FIG. 11 may be implemented in the contexts of the likes of computing systems, networks, exchanges, servers, or combinations thereof disclosed herein. The computing system 1100 of FIG. 11 includes one or more processors 1110 and main memory 1120. Main memory 1120 stores, in part, instructions and data for execution by processor 1110. Main memory 1120 may store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. The components may be connected through one or more data transport means. Processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 may store the system software for implementing embodiments of the present technology for purposes of loading that software into main memory 1120.

Portable storage device 1140 operates in conjunction with a portable non-volatile storage medium, such as a floppy disk, compact disk (CD), digital video disc (DVD), or USB storage device, to input and output data and code to and from the computer system 1100 of FIG. 11. The system software for implementing embodiments of the present technology may be stored on such a portable medium and input to the computer system 1100 via the portable storage device 1140.

Input devices 1160 provide a portion of a user interface. Input devices 1160 may include an alphanumeric keypad, such as a keyboard, for inputting alphanumeric and other information, or a pointing device, such as a mouse, a trackball, stylus, or cursor direction keys, or voice to text. Additionally, the system 1100 as shown in FIG. 11 includes output devices 1150. Suitable output devices include speakers, printers, network interfaces, and monitors.

Display system 1170 may include a liquid crystal display (LCD) or other suitable display device. Display system 1170 receives textual and graphical information and processes the information for output to the display device.

Peripherals devices 1180 may include any type of computer support device to add additional functionality to the computer system. Peripheral device(s) 1180 may include a modem or a router.

The components provided in the computer system 1100 of FIG. 11 are those typically found in computer systems that may be suitable for use with embodiments of the present technology and are intended to represent a broad category of such computer components that are well known in the art. Thus, the computer system 1100 of FIG. 11 may be a personal computer, hand held computing system, telephone, mobile computing system, workstation, server, minicomputer, mainframe computer, or any other computing system. The computer may also include different bus configurations, networked platforms, multi-processor platforms, and so forth. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD- ROM disk, DVD, any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for fulfilling travel requests, the system comprising:
    a memory for storing executable instructions;
    a processor for executing the instructions;
    an artificial intelligence engine stored in the memory and executable by the processor, the artificial intelligence engine configured to generate an a priori representation of knowledge as a plurality of travel itinerary components that provide context for a parser to generate an itinerary network associated with a travel itinerary request;
    the parser stored in the memory and executable by the processor, the parser utilizing the artificial intelligence engine to:
        receive the travel itinerary request from an exchange;
        determine, using the a priori representation of knowledge, associated itinerary components received in the travel itinerary request that correspond to one or more of the plurality of travel itinerary components; and
        generate the itinerary network associated with the travel itinerary request, the itinerary network comprising the associated itinerary components and containing information necessary for a scheduler to generate an unconstrained schedule therefrom, by:
            creating a plurality of nodes within the itinerary network, each of the plurality of nodes representing an associated itinerary component;
            determining, for each associated itinerary component, whether one or more of the plurality of travel itinerary components corresponds to each associated itinerary component, and when there is no correspondence, adding a new node to the itinerary network corresponding to each associated itinerary component;
            creating a plurality of edges within the itinerary network, each of the plurality of edges connecting two of the plurality of nodes, the plurality of edges representing an order of the plurality of nodes in time based on dependencies between the plurality of nodes; and
            determining, for each associated itinerary component, whether one or more of the plurality of edges corresponds to a dependency of each associated itinerary component, and when there is no correspondence, adding a new edge to the itinerary network connecting each associated itinerary component to one of the plurality of nodes;
    the scheduler stored in the memory and executable by the processor, the scheduler configured to:
        generate the unconstrained schedule using the itinerary network;
        generate a travel itinerary by allocating inventory to the unconstrained schedule, the travel itinerary being consistent with the itinerary network; and
        return the generated travel itinerary to the exchange that fulfills the travel itinerary request.

2. The system of claim 1, wherein the dependencies include one or more of the following: a location, a time, a traveler preference, and any combination thereof.

3. The system of claim 1, wherein the determining, using the a priori representation of knowledge, the associated itinerary components received in the travel itinerary request includes decoding the travel itinerary request by determining phrases and tokens of the travel itinerary request, wherein the tokens include travel attributes related to the travel itinerary request; and
the phrases include an ordered list of tokens.

4. The system of claim 3, wherein the parser is further configured to:
    based on the ordered list of tokens, determine possible next tokens of the travel itinerary request;
    based on the possible next tokens, detect insufficient information associated with the travel itinerary request; and
    based on the determining, request the insufficient information from the user.

5. The system of claim 3, wherein the parser is further configured to:
    analyze the phrases; and
    based on the analysis, determine equivalence classes of the phrases.

6. The system of claim 1, wherein the generate the itinerary network further comprises:
    generating an adjacency matrix using the itinerary components and their respective dependencies;
    creating a directed acyclic graph using the adjacency matrix; and
    determining a topological ordering of itinerary components using the directed acyclic graph, the topological ordering comprising an arrangement of the itinerary components using their respective location and time dependencies.

7. The system of claim 1, wherein the parser is further configured to create annotations for one or more of the plurality of nodes, wherein the annotations indicate presence, in the one or more of the plurality of nodes, of sufficient information related to one or more travel attribute of the travel itinerary request.

8. The system of claim 1, wherein the parser is further configured to:
    during execution of the travel itinerary by the user, receive, from the user, a modification to the travel itinerary;
    determine dependency adjustments associated with the plurality of nodes and the plurality of edges; and
    adjust the travel itinerary based upon the dependency adjustments caused by the modification of the travel itinerary.

9. The system of claim 1,
    wherein the determining the associated itinerary components received in the travel itinerary includes decoding the travel itinerary request by determining phrases and tokens of the travel itinerary request, wherein the tokens include travel attributes related to the travel itinerary request, and wherein the phrases include an ordered list of tokens; and wherein the parser further utilizes the artificial intelligence engine to:
  based on the ordered list of tokens, determine possible next tokens of the travel itinerary request;
  based on the possible next tokens, detect insufficient information associated with the travel itinerary request; and
  based on the determining, request the insufficient information from the user.

10. The system of claim 1, wherein the exchange is presented on a user interface of a computing device associated with a travel user.

11. The system of claim 1, wherein the exchange is a cloud based computing environment.

12. A method for fulfilling travel requests, the method comprising:
  receiving a travel itinerary request from an exchange;
  determining, using an a priori representation of knowledge as a plurality of travel itinerary components, associated itinerary components received in the travel itinerary request that correspond to one or more of the plurality of travel itinerary components, the a priori representation of knowledge providing context to generate an itinerary network associated with the travel itinerary request;
  generating the itinerary network associated with the travel itinerary request, the itinerary network comprising the associated itinerary components and containing information necessary to generate an unconstrained schedule therefrom, by:
    creating a plurality of nodes within the itinerary network, each of the plurality of nodes representing an associated itinerary component;
    determining, for each associated itinerary component, whether one or more of the plurality of travel itinerary components corresponds to each associated itinerary component;
    adding a new node to the itinerary network corresponding to each associated itinerary component that has no corresponding one or more of the plurality of travel itinerary components;
    creating a plurality of edges within the itinerary network, each of the plurality of edges connecting two of the plurality of nodes, the plurality of edges representing an order of the plurality of nodes in time based on dependencies between the plurality of nodes;
    determining, for each associated itinerary component, whether one or more of the plurality of edges corresponds to a dependency of each associated itinerary component;
    for each dependency that has no corresponding one or more of the plurality of edges, adding a new edge to the itinerary network connecting the associated itinerary component of that dependency to one of the plurality of nodes; and
  generating the unconstrained schedule using the itinerary network;
  generating a travel itinerary by allocating inventory to the unconstrained schedule, the travel itinerary being consistent with the itinerary network; and
  returning the generated travel itinerary to the exchange that fulfills the travel itinerary request.

13. The method of claim 12, wherein the determining, using the a priori representation of knowledge, the associated itinerary components received in the travel itinerary request includes decoding the travel itinerary request by determining phrases and tokens of the travel itinerary request, wherein:
  the tokens include travel attributes related to the travel itinerary request; and
  the phrases include an ordered list of tokens.

14. The method of claim 13, further comprising:
  based on the ordered list of tokens, determining possible next tokens of the travel itinerary request;
  based on the possible next tokens, detecting insufficient information associated with the travel itinerary request; and
  based on the determining, requesting the insufficient information from the user.

15. The method of claim 13, further comprising:
  analyzing the phrases; and
  based on the analysis, determining equivalence classes of the phrases.

16. The method of claim 12, wherein the generating the itinerary network further comprises:
  generating an adjacency matrix using the itinerary components and their respective dependencies;
  creating a directed acyclic graph using the adjacency matrix; and
  determining a topological ordering of itinerary components using the directed acyclic graph, the topological ordering comprising an arrangement of the itinerary components using their respective location and time dependencies.

17. The method of claim 12, further comprising creating annotations for one or more of the plurality of nodes, wherein the annotations indicate presence, in the one or more of the plurality of nodes, of sufficient information related to one or more travel attribute of the travel itinerary request.

18. The method of claim 12, further comprising:
  during execution of the travel itinerary by the user, receiving, from the user, a modification to the travel itinerary;
  determining dependency adjustments associated with the plurality of nodes and the plurality of edges; and
  adjusting the travel itinerary based upon the dependency adjustments caused by the modification of the travel itinerary.

19. A system for fulfilling travel requests, the system comprising:
  a memory for storing executable instructions;
  a processor for executing the instructions;
  an artificial intelligence engine stored in the memory and executable by the processor, the artificial intelligence engine configured to generate an a priori representation of knowledge as a plurality of travel itinerary components represented by a plurality of nodes connected by a plurality of edges, the plurality of edges representing an order of the plurality of nodes in time based on dependencies between the plurality of nodes, the plurality of nodes and plurality of edges assembled in an itinerary network that provides context for a parser to modify the itinerary network to be associated with a travel itinerary request;

the parser stored in the memory and executable by the processor, the parser utilizing the artificial intelligence engine to:
  receive the travel itinerary request from an exchange;
  determine, using the a priori representation of knowledge, associated itinerary components received in the travel itinerary request; and
  modify the itinerary network to be associated with the travel itinerary request, the itinerary network comprising the associated itinerary components and containing information necessary for a scheduler to generate an unconstrained schedule therefrom, by:
    determining, for each associated itinerary component, whether one or more of the plurality of travel itinerary components corresponds to each associated itinerary component, and when there is no correspondence, adding a new node to the itinerary network corresponding to each associated itinerary component; and
    determining, for each associated itinerary component, whether one or more of the plurality of edges corresponds to a dependency of each associated itinerary component, and when there is no correspondence, adding a new edge to the itinerary network connecting each associated itinerary component to one of the plurality of nodes; and the scheduler stored in the memory and executable by the processor, the scheduler configured to:
  generate the unconstrained schedule using the itinerary network;
  generate a travel itinerary by allocating inventory to the unconstrained schedule, the travel itinerary being consistent with the itinerary network; and
  return the generated travel itinerary to the exchange that fulfills the travel itinerary request.

* * * * *